United States Patent
Nogami et al.

(10) Patent No.: US 7,495,665 B2
(45) Date of Patent: Feb. 24, 2009

(54) STORAGE MEDIUM HAVING GAME PROGRAM STORED THEREON AND GAME APPARATUS

(75) Inventors: Hisashi Nogami, Kyoto (JP); Hiromichi Miyake, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 445 days.

(21) Appl. No.: 11/349,988

(22) Filed: Feb. 9, 2006

(65) Prior Publication Data

US 2006/0258444 A1    Nov. 16, 2006

(30) Foreign Application Priority Data

May 13, 2005    (JP)    ............................. 2005-141563

(51) Int. Cl.
   *G06T 15/10*    (2006.01)
(52) U.S. Cl. .................. 345/427; 345/419; 345/441; 345/442; 463/30; 463/31; 463/32; 463/33; 463/34; 463/35; 463/36; 463/37; 463/38; 463/39
(58) Field of Classification Search .............. 345/419, 345/441, 442; 463/30–39
   See application file for complete search history.

(56) References Cited

U.S. PATENT DOCUMENTS

| 7,367,885 B2 * | 5/2008 | Escalera et al. | ............... 463/32 |
| 2004/0102244 A1 * | 5/2004 | Kryuchkov et al. | ........... 463/32 |

FOREIGN PATENT DOCUMENTS

| JP | 10-198819 | 7/1998 |
| JP | 2002-000939 | 1/2002 |

* cited by examiner

*Primary Examiner*—Kimbinh T Nguyen
(74) *Attorney, Agent, or Firm*—Nixon & Vanderhye P.C.

(57) ABSTRACT

Plane position coordinates indicating a position of a player object in a plane game field is updated based on an action which is performed by the player object on the plane game field and is determined according to an input signal. The plane position coordinates in a coordinate system based on the plane game field are converted into coordinates in a coordinate system based on a game field of a curved surface, thereby obtaining curved surface position coordinates. Based on the curved surface position coordinates, the player object is positioned in the game field of the curved surface and displayed on a display screen.

6 Claims, 18 Drawing Sheets

FIG. 10

| TOUCHED OBJECT \ EQUIPMENT | SHOVEL | AX | FISHING ROD |
|---|---|---|---|
| GROUND (FP) | PC DIGS A HOLE IN THE GROUND WITH SHOVEL | PC MOVES | PC MOVES |
| TREE (OBJ) | PC MOVES | PC CUTS TREE | PC MOVES |
| ROCK (OBJ) | ROCK REPELS SHOVEL | ROCK REPELS SHOVEL | PC MOVES |
| RIVER (FP) | PC SWINGS SHOVEL | PC MOVES | PC DOES FISHING |
| MAILBOX (OBJ) | PC OPENS MAILBOX | PC OPENS MAILBOX | PC OPENS MAILBOX |

STORAGE MEDIUM HAVING GAME PROGRAM STORED THEREON AND GAME APPARATUS

CROSS REFERENCE OF RELATED APPLICATION

The disclosure of Japanese Patent Application No. 2005-141563 is incorporated herein by reference.

BACKGROUND OF THE INVENTION

1. Field of the Invention

The present invention relates to a storage medium having a game program stored thereon and a game apparatus, and more particularly to a storage medium having stored thereon a game program and a game apparatus for displaying a game image using a game field of a curved surface.

2. Description of the Background Art

Conventionally, widespread is a game apparatus for providing a game which allows a player to control a player object displayed on a game screen. For example, as disclosed in Japanese Laid-Open Patent Publication No. 2002-939 (hereinafter, referred to as Patent Document 1) and Japanese Laid-Open Patent Publication No. 10-198819 (hereinafter, referred to as Patent Document 2), the player object and other objects positioned on a plane game field in a virtual space are taken by a virtual camera and represented in an image, thereby generating a game screen.

As shown in FIGS. 21 to 23 of Patent Document 1, a character (central character) and an opponent are positioned on a plane game field and represented in an image so as to position the character at the center of a game screen. Further, as shown in FIGS. 4 to 9 of Patent Document 2, a water surface is represented in an image using a plane field (polygon) and the image is outputted to a monitor.

Here, when a cylindrical or a spherical game field is used, a virtual space can be represented in a game image with increased stereoscopic effect as compared to a game image generated using the plane game field. However, when the game field has a cylindrical or spherical surface, objects and the like which move on the game field must be moved in accordance with a shape of the surface. Therefore, a processing load for moving the object along the field of a curved surface is increased as compared to a process of moving the object on the plane field, thereby complicating a calculation for moving the object.

For example, in the case of the plane game field, a direction of gravity acting on the game field in the virtual space is perpendicular to a flat plane, and the direction of gravity is constant with respect to the virtual space. On the other hand, in the case of the cylindrical or the spherical game field, the direction of gravity is a radial direction of the game field, that is, the direction of gravity is a direction radiating into the virtual space, whereby a process, which has to be performed in consideration of the direction of gravity, is complicated. Moreover, when the object is moved along the cylindrical or the spherical game field, the object is moved in a curved direction, thereby making the calculation for moving the object difficult.

Further, when an object in the virtual space represented on a screen is designated using a pointing device such as a touch panel for designating an input position or a coordinate point on the screen, complicated is a process for determining whether or not the object disposed in the cylindrical or the spherical game field is designated. Specifically, an image model representing a player object and respective image models representing other objects are disposed on the cylindrical or spherical game field, and the state of the cylindrical or spherical game field is taken by a virtual camera and represented in an image, thereby generating a game screen. That is, each of the image models is disposed in a direction (direction of gravity) perpendicular to a position of each of the image models in the game field, whereby each of the image models is disposed in a different reference direction based on its direction of gravity. When an image model designated by a player with the pointing device is identified in the virtual space, a processing load is increased for accurate determination because the image models have complicated shapes and the game field having the image models disposed therein are cylindrical or spherical.

SUMMARY OF THE INVENTION

A storage medium is disclosed herein having stored thereon a game program and a game apparatus for displaying a game screen in which objects are disposed on a cylindrical or spherical game field of a curved surface and simplifying calculations so as to reduce processing load.

The reference numerals, step numbers (a step is abbreviated as S and only a step number is indicated), and the like in the parentheses indicate the correspondence with the embodiment described below in order to aid in understanding the disclosed embodiment(s) and are not intended to limit, in any way, the claims.

A storage medium has been developed having stored thereon a game program to be executed by a computer (21) of a game apparatus (1) which is operated according to an input signal (DC1) from an input device (15) based on an operation of a player and which displays on a display screen (12) a game image representing at least a portion of a virtual space including a game field (FD) of a curved surface in which at least a player object (PC) exists. The game program causes the computer to execute: a plane position coordinate storage step (DO and S50); a coordinate update step (S62); a first coordinate conversion step (S64); and a display control step (S65). The plane position coordinate storage step stores, in a memory (24), plane position coordinates (position coordinates of DO (Xpc, Ypc, Zpc)) indicating a position of the player object in a coordinate system (X,Y, Z axis coordinates) of a plane game field (FP). The coordinate update step (S91 to S112) updates the plane position coordinates in the plane game field stored in the memory, based on an action which is performed by the player object on the plane game field and is determined according to the input signal (S56 to S60). The first coordinate conversion step performs a coordinate conversion for converting the updated plane position coordinates in the coordinate system based on the plane game field into curved surface position coordinates in a coordinate system based on a game field of the curved surface. The display control step positions the player object on the game field of the curved surface, based on the curved surface position coordinates, and displays the player object on the display In a second aspect based on the first aspect, the game field of the curved surface is cylindrical and at least a portion of a cylindrical periphery is used as a game field. The first coordinate conversion step includes a step of performing the coordinate conversion so that the plane game field is converted into the cylindrical game field.

In a third aspect based on the second aspect, in the coordinate conversion performed by the first coordinate conversion step, a coordinate (X axis coordinate) in a first axial direction along the plane game field is converted into a coordinate in a cylinder axis direction in the cylindrical game field, a coordinate (Z-axis coordinate) which is in a second axial direction along the plane game field and is perpendicular to the first axial direction is converted into a coordinate in a circumferential direction of the cylindrical game field, and a coordinate (Y-axis coordinate) which is in a third axial direction and is perpendicular to the plane game field is converted into a coordinate in a radial direction of the cylindrical game field.

In a fourth aspect based on the first aspect, the input device is a pointing device for outputting, as the input signal, input coordinates based on a coordinate system of the display screen in accordance with the operation of the player. The game program causes the computer to further execute a curved surface input coordinate calculation step (S60) and a second coordinate conversion step (S61). The curved surface input coordinate calculation step calculates curved surface input coordinates (DC2) which overlap with the input coordinates on the display screen and which are set on the game field of the curved surface in the virtual space. The second coordinate conversion step performs a coordinate conversion for converting the curved surface input coordinates in the coordinate system based on the game field of the curved surface into plane input coordinates (DC3) in the coordinate system based on the plane game field. The coordinate update step includes a step of moving the player object in the plane game field based on the plane input coordinates (S99 and S112) and updates the plane position coordinates of the player object. The pointing device is an input device for designating an input position and coordinates on a screen, and a touch panel, a mouse, a track pad, a track ball, and the like can be used as the input device. A coordinate system used for each input device is a touch panel coordinate system or a screen coordinate system.

In a fifth aspect based on the first aspect, the input device is a pointing device for outputting, as the input signal, input coordinates based on a coordinate system of the display screen in accordance with the operation of the player. The plane position coordinate storage step includes a step of further storing, in the memory, plane position coordinates indicating respective positions of other objects in the coordinate system of the plane game field. The first coordinate conversion step includes a step of performing a coordinate conversion for converting, into the curved surface position coordinates, the plane position coordinates of the respective positions of the other objects. The game program causes the computer to further execute: a simplified model storage step (DI2 and S50); a simplified model positioning step (S55); a designated object detection step (S57 to S59); and an action process step (S91 to S98 and S101 to S111). The simplified model storage step stores, in a memory, simplified models representing a shape of the player object and shapes of the other objects, each of the simplified models obtained by combining standard solids. The simplified model positioning step positions the simplified model of the player object and the respective simplified models of the other objects in the virtual space including the game field of the curved surface, based on the curved surface position coordinates obtained by the coordinate conversion performed by the first coordinate conversion step. The designated object detection step detects, as a designated object having been designated by the player, the simplified model which overlaps with the input coordinates on the display screen and which is positioned in the virtual space. The action process step causes the player object to perform, in the plane game field, an action on the designated object detected in the designated object detection step. The display control step includes a step of positioning, in the virtual space including the game field of the curved surface, the player object which is caused to perform the action by the action process step, and displays the player object on the display screen.

A sixth aspect is directed to a game apparatus which is operated according to an input signal from an input device based on an operation of a player and which displays on a display screen a game image representing at least a portion of a virtual space including a game field of a curved surface on which at least a player object exists. The game apparatus comprises: a storage means (24); a plane position coordinate storage control means; a coordinate update means; a first coordinate conversion means; and a display control means. The plane position coordinate storage control means stores, in the storage means, plane position coordinates indicating a position of the player object in a coordinate system of a plane game field. The coordinate update means updates the plane position coordinates in the plane game field stored in the storage means, based on an action which is performed by the player object in the plane game field and is determined according to the input signal. The first coordinate conversion means performs a coordinate conversion for converting the updated plane position coordinates in a coordinate system based on the plane game field into curved surface position coordinates in a coordinate system based on the game field of the curved surface. The display control means positions the player object on the game field of the curved surface, based on the curved surface position coordinates, and displays the player object on the display screen.

According to the first aspect, a plane game field is used when performed is a process of moving a player character, a process of causing the player character to perform an action, or the like. Thereafter, plane position coordinates based on the plane game field are converted into coordinates in a coordinate system based on a field of a curved surface, thereby generating a game image. Therefore, the plane game field is used to perform a process of moving an object, a process of causing the object to perform an action, or the like, thereby reducing processing load. Further, plane position coordinates based on a result of the processes are converted into coordinates in the coordinate system based on the game field of the curved surface, and the player object positioned in the game field of the curved surface is used to generate a game image, thereby representing a virtual space in the game image with increased stereoscopic effect.

According to the second aspect, displayed is a game image in which at least a portion of a cylindrical periphery is represented as a game field, whereby a new virtual space having increased stereoscopic effect is represented in the game image.

According to the third aspect, coordinate values of three coordinate axes which are orthogonal to each other and which are set in the plane game field, are converted into a coordinate value of a cylinder axis direction, a coordinate value of a circumferential direction, and a coordinate value of a radial direction, respectively, which are set in the cylindrical game field, whereby coordinate conversion can be easily performed.

According to the fourth aspect, when a pointing device such as a touch panel is used as an input device, a position which is in a virtual space and which is designated by the pointing device is converted into coordinates in a coordinate system of the plane game field. Therefore, an input position in the game field of the curved surface is converted into coordinates in the plane game field and the processes such as moving an object or causing the object to perform an action can be easily performed.

According to the fifth aspect, when a pointing device such as a touch panel is used as an input device, a simplified model is positioned in the game field of the curved surface, thereby detecting an object designated by a player. Therefore, processing load is reduced in the determination process, and the detection accuracy can be improved.

Moreover, the game apparatus can realize the same effect as that of the storage medium having the aforementioned game program stored thereon.

These and other objects, features, aspects and advantages of the disclosed embodiment will become more apparent from the following detailed description when taken in conjunction with the accompanying drawings.

BRIEF DESCRIPTION OF THE DRAWINGS

FIG. 10 is a diagram illustrating an example of action contents;

DESCRIPTION OF THE PREFERRED EMBODIMENTS

Figure 1:
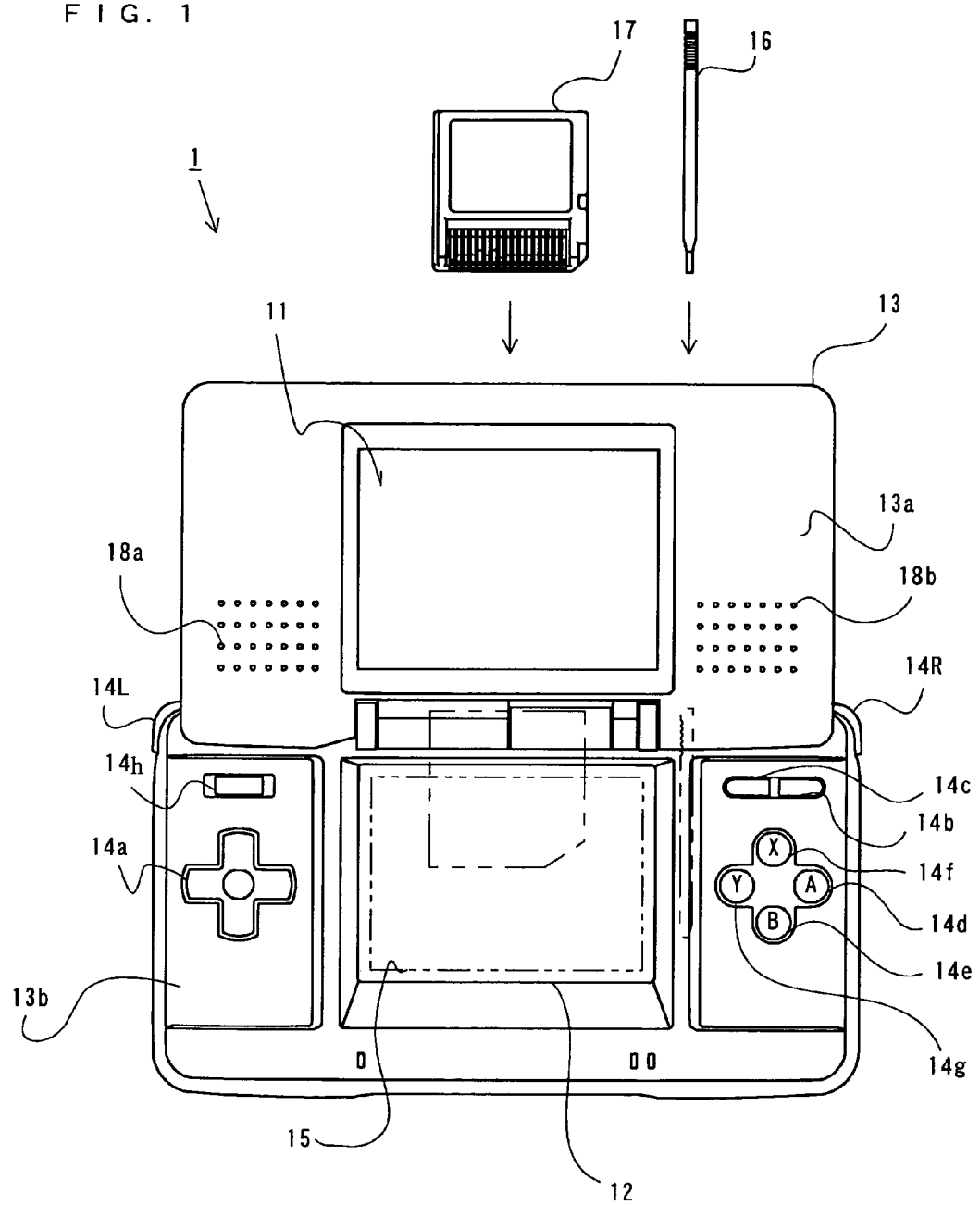
FIG. 1 is a view illustrating an outer appearance of a game apparatus 1 for executing a game program.

A game apparatus for executing a game program is described with reference to the drawings. While the game program may be executed by any computer system capable of performing a display on a display device, a description of a case where the game program is executed by an information processing apparatus such as a game apparatus 1 will be given. FIG. 1 is a view illustrating an outer appearance of the game apparatus 1 for executing the game program. In the present embodiment, a portable game apparatus will be described as an example of the game apparatus 1.

In FIG. 1, a game apparatus 1 includes a first liquid crystal display (hereinafter, referred to as "an LCD") 11 and a second LCD 12. A housing 13 is composed of an upper housing 13a and a lower housing 13b. The first LCD 11 is accommodated in the upper housing 13a and the second LCD 12 is accommodated in the lower housing 13b. Each of the first LCD 11 and the second LCD 12 has a resolution of 256 dots×192 dots. Although in the present embodiment, an LCD is used as a display device, any other display device, for example, a display device using an EL (electro luminescence), can be used. Further, the resolutions of the first LCD 11 and the second LCD 12 may be arbitrarily chosen.

On the upper housing 13a, provided are sound holes 18a and 18b for outputting a sound from a pair of loudspeakers 30a and 30b shown in FIG. 2 described below.

On the lower housing 13b, provided as input devices are a cross switch 14a, a start switch 14b, a select switch 14c, an A button 14d, a B button 14e, an X button 14f, a Y button 14g, a power supply switch 14h, an L button 14L and an R button 14R. Further, the second LCD 12 has a touch panel 15 mounted on the screen thereof as another input device. Moreover, the lower housing 13b is provided with respective receptacles into which a memory card 17 and a stick 16 are inserted.

The touch panel 15 maybe of any type such as a resistive film type, an optical type (infrared type), or a capacitive coupling type. The touch panel 15 is, for example, a pointing device having a function of outputting, when the touch panel 15 has its surface touched by the stick 16, coordinate data corresponding to the touched position. Although in the present embodiment a player controls the touch panel 15 with the stick 16, the player can control the touch panel 15 with a pen (stylus pen) or a finger instead of the stick 16. In the present embodiment, the touch panel 15 has a resolution (detection accuracy) of 256 dots×192 dots, similar to the resolution of the second LCD 12. However, the touch panel 15 need not necessarily have the same resolution as the second LCD 12.

The memory card 17 is a storage medium having a game program and the like stored thereon, and is detachably inserted into the receptacle provided in the lower housing 13b.

Next, referring to FIG. 2, the internal structure of the game apparatus 1 will be described. FIG. 2 is a block diagram illustrating an internal structure of the game apparatus 1.

Figure 2:
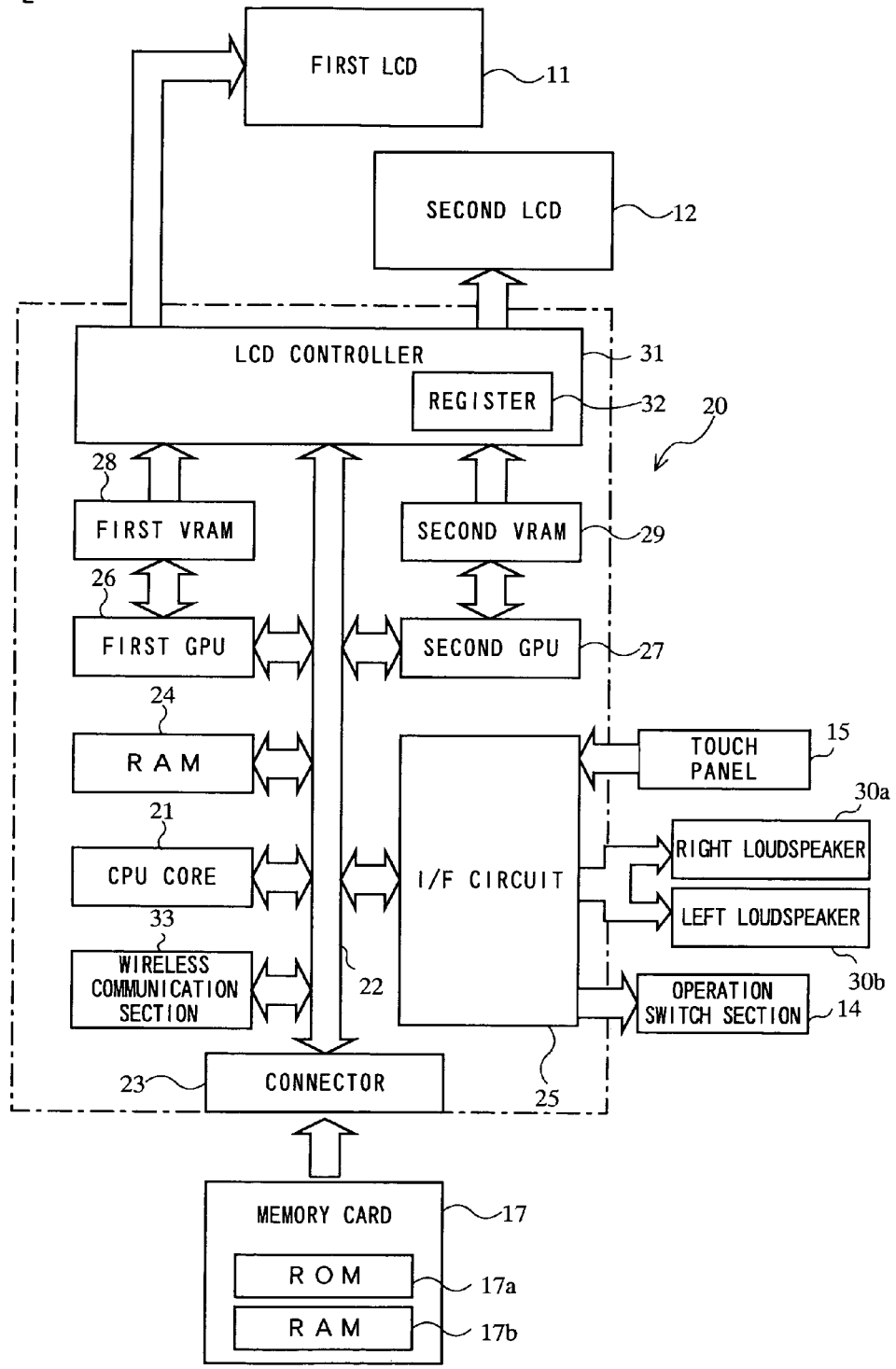
FIG. 2 is a block diagram illustrating an internal structure of the game apparatus 1 shown in FIG. 1.

In FIG. 2, a CPU core 21 is mounted on the electronic circuit board 20 accommodated in the housing 13. Via a bus 22, the CPU core 21 is connected to a connector 23, an input/output interface circuit (denoted as an I/F circuit in FIG. 2) 25, a first graphics processing unit (hereinafter, referred to as "GPU") 26, a second GPU 27, a RAM 24, an LCD controller 31, and a wireless communication section 33. The memory card 17 is detachably connected to the connector 23. The memory card 17 includes a ROM 17a for storing a game program and a RAM 17b for storing backup data in a rewritable manner. A game program stored in the ROM 17a of the memory card 17 is loaded to the RAM 24, and the game program having been loaded to the RAM 24 is executed by the CPU core 21. Data used for generating temporary data obtained by the CPU core 21 executing the program, and the like, are stored in the RAM 24 as necessary in addition to the game program. The touch panel 15, the right loudspeaker 30*a*, the left loudspeaker 30*b* and an operation switch section 14 including the cross switch 14*a*, the A button 14*d* and the like as shown in FIG. 1 are connected to the I/F circuit 25. The right loudspeaker 30*a* and the left loudspeaker 30*b* are placed inside the sound holes 18*a* and 18*b*, respectively.

The first GPU 26 is connected to a first video-RAM (hereinafter, referred to as "VRAM") 28. The second GPU 27 is connected to a second VRAM 29. In accordance with an instruction from the CPU core 21, the first GPU 26 generates a first display image using the data stored in the RAM 24 for generating the display image, and writes display image data into the first VRAM 28. Similarly, in accordance with an instruction from the CPU core 21, the second GPU 27 generates a second display image, and writes display image data into the second VRAM 29. The first VRAM 28 and the second VRAM 29 are connected to the LCD controller 31.

The LCD controller 31 include a register 32. The register 32 stores a value "0" or "1" in accordance with an instruction from the CPU core 21. When the register 32 stores a value "0", the LCD controller 31 outputs to the first LCD 11 the first game image which has been written into the first VRAM 28, and outputs to the second LCD 12 the second game image which has been written into the second VRAM 29. On the other hand, when the register 32 stores a value "1", the LCD controller 31 outputs to the second LCD 12 the first game image which has been written into the first VRAM 28, and outputs to the first LCD 11 the second game image which has been written into the second VRAM 29.

The wireless communication section 33 has a function of exchanging data used for game process and other data with a wireless communication section 33 of another game apparatus, and the function is, for example, a wireless communication function based on the IEEE802.11 wireless LAN standard. The wireless communication section 33 outputs the received data to the CPU core 21. Further, the wireless communication section 33 transmits data to another game apparatus according to an instruction from the CPU core 21. The wireless communication section 33 or the storage section of the game apparatus 1 has a protocol such as TCP/IP (transmission control protocol/Internet protocol) or a predetermined browser, whereby the game apparatus 1 can be connected to a network such as the Internet via the wireless communication section 33. The game apparatus 1 enables data such as a document and an image accessible on a network to be displayed on the first LCD 11 and the second LCD 12.

The game program may be supplied to the computer system not only through an external storage medium such as the memory card 17 but also through a wired or a wireless communication line. Moreover, the game program may be previously stored in a non-volatile storage device in the computer system. Examples of the information storage medium for storing the game program are not limited to the aforementioned non-volatile semiconductor memory, but may also be a CD-ROM, a DVD or any other optical disk type storage medium.

Figure 3:
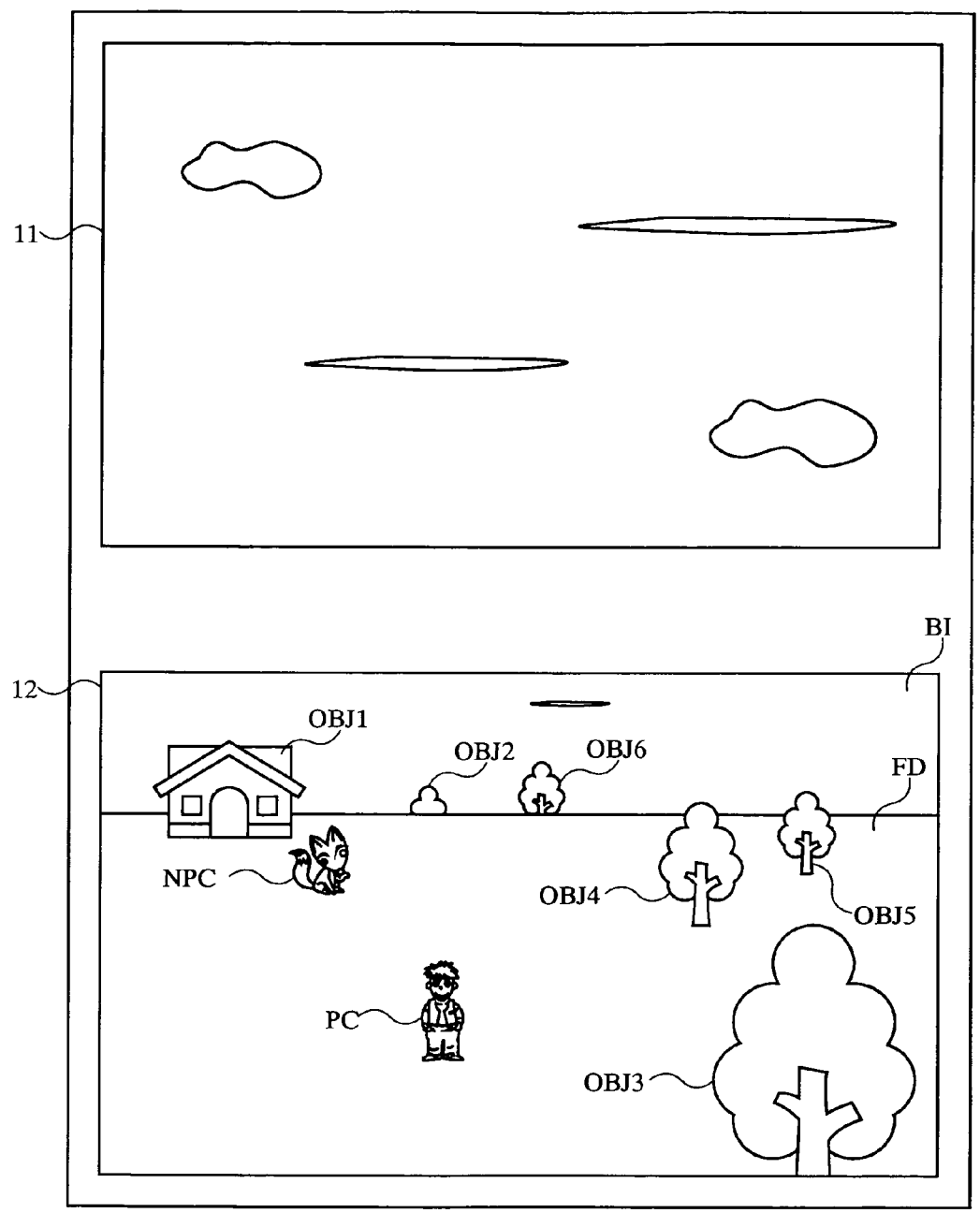
FIG. 3 is a diagram illustrating an example of screen display on a first LCD 11 and a second LCD 12.
Figure 4:
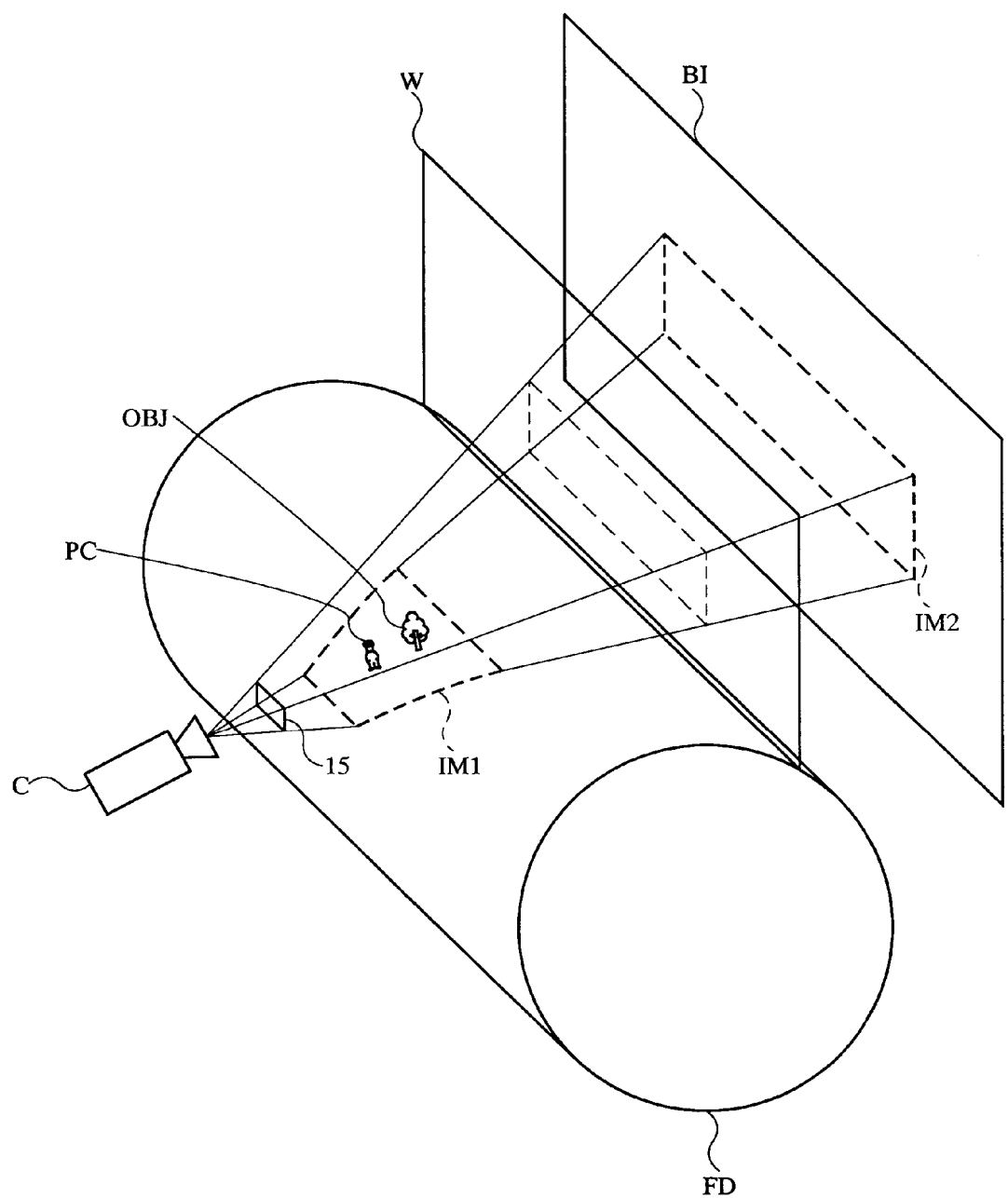
FIG. 4 is a schematic perspective view illustrating a positional relationship between a touch panel 15 and a drum coordinate system used for obtaining a game image to be displayed on the second LCD 12.
Figure 5:
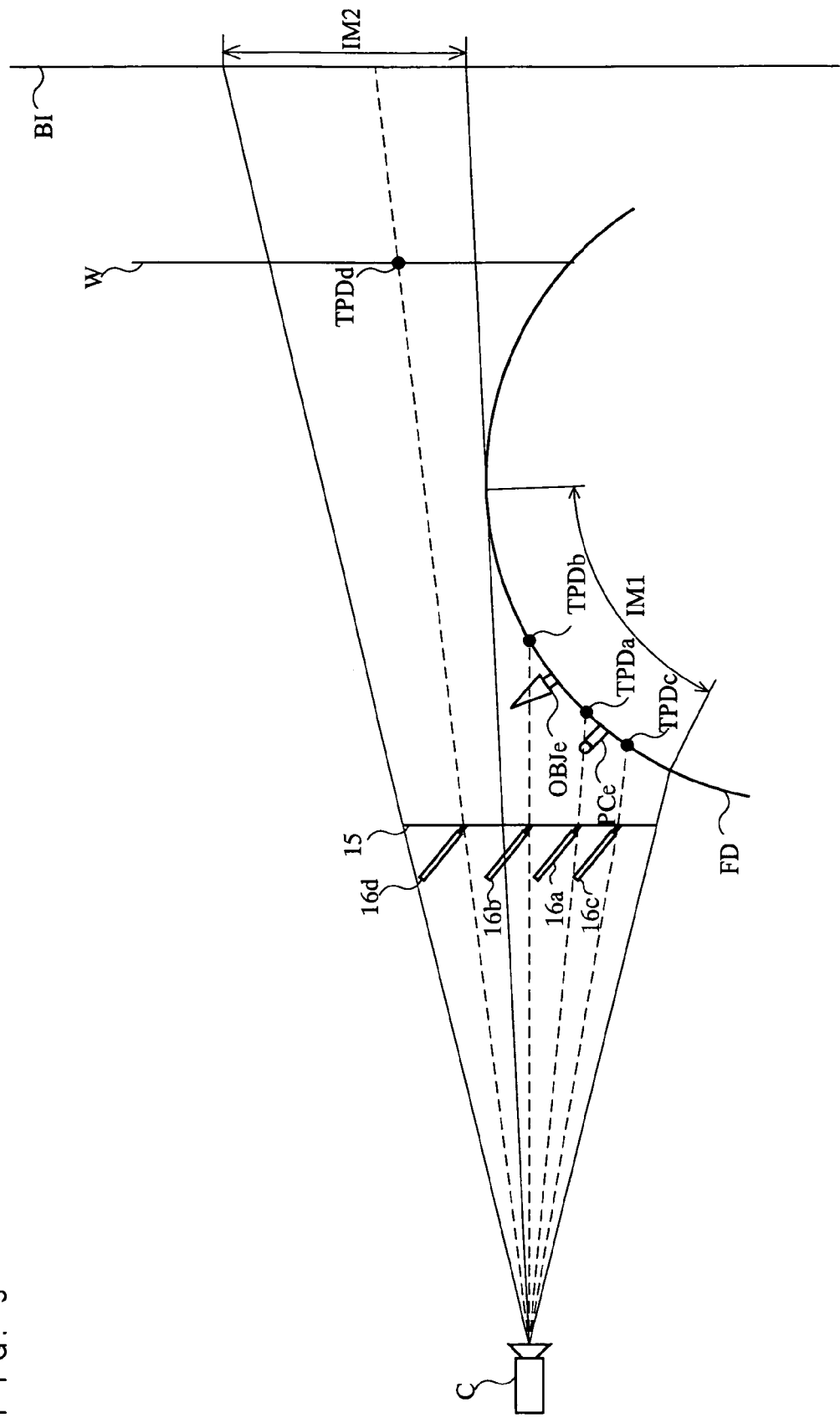
FIG. 5 is a side view illustrating a positional relationship between the drum coordinate system and the touch panel 15.
Figure 6:
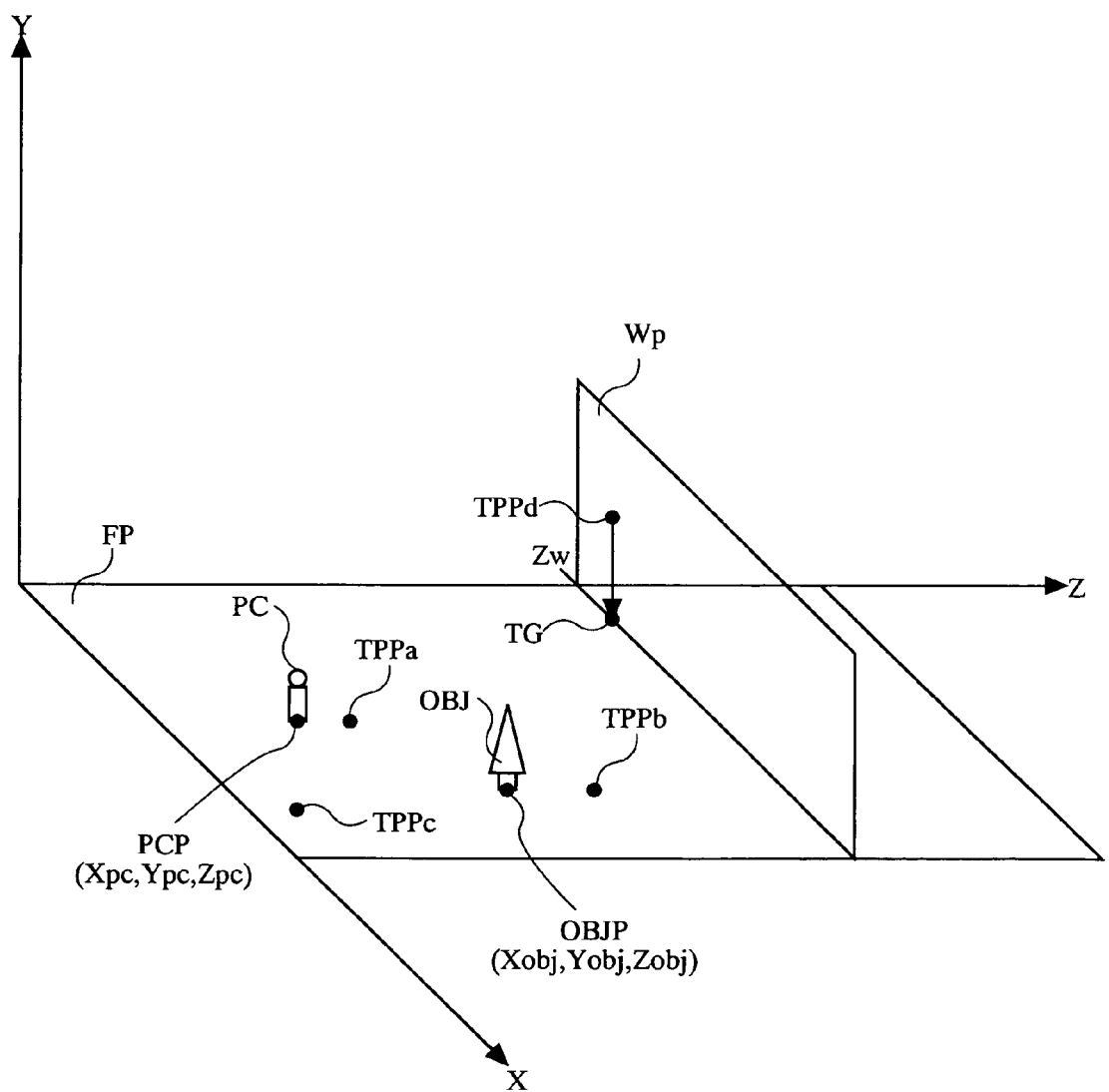
FIG. 6 is a schematic perspective view illustrating a plane coordinate system used for a game process.
Figure 7:
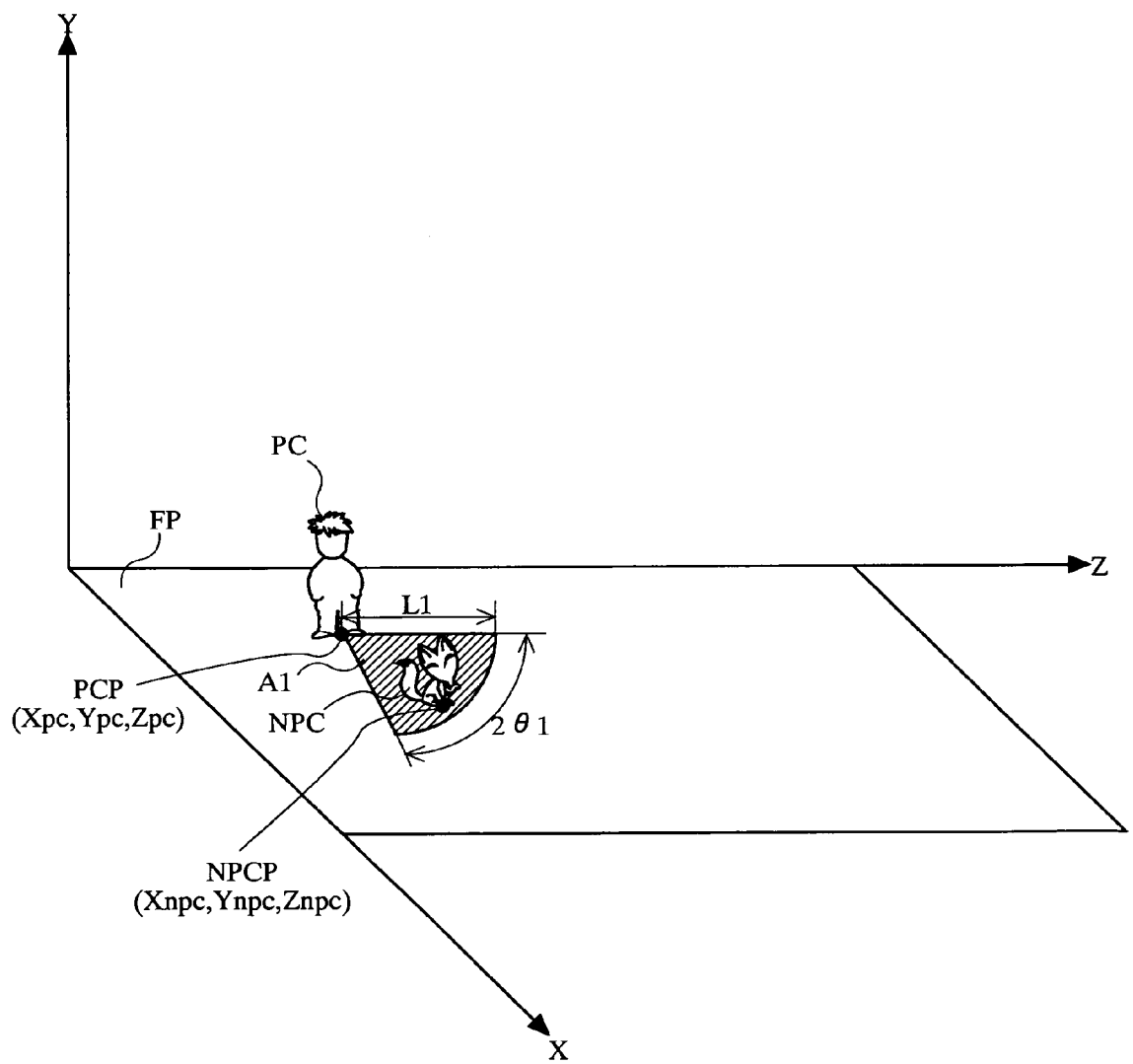
FIG. 7 is a schematic perspective view illustrating a conversation range A1 set for a player character PC.
Figure 8:
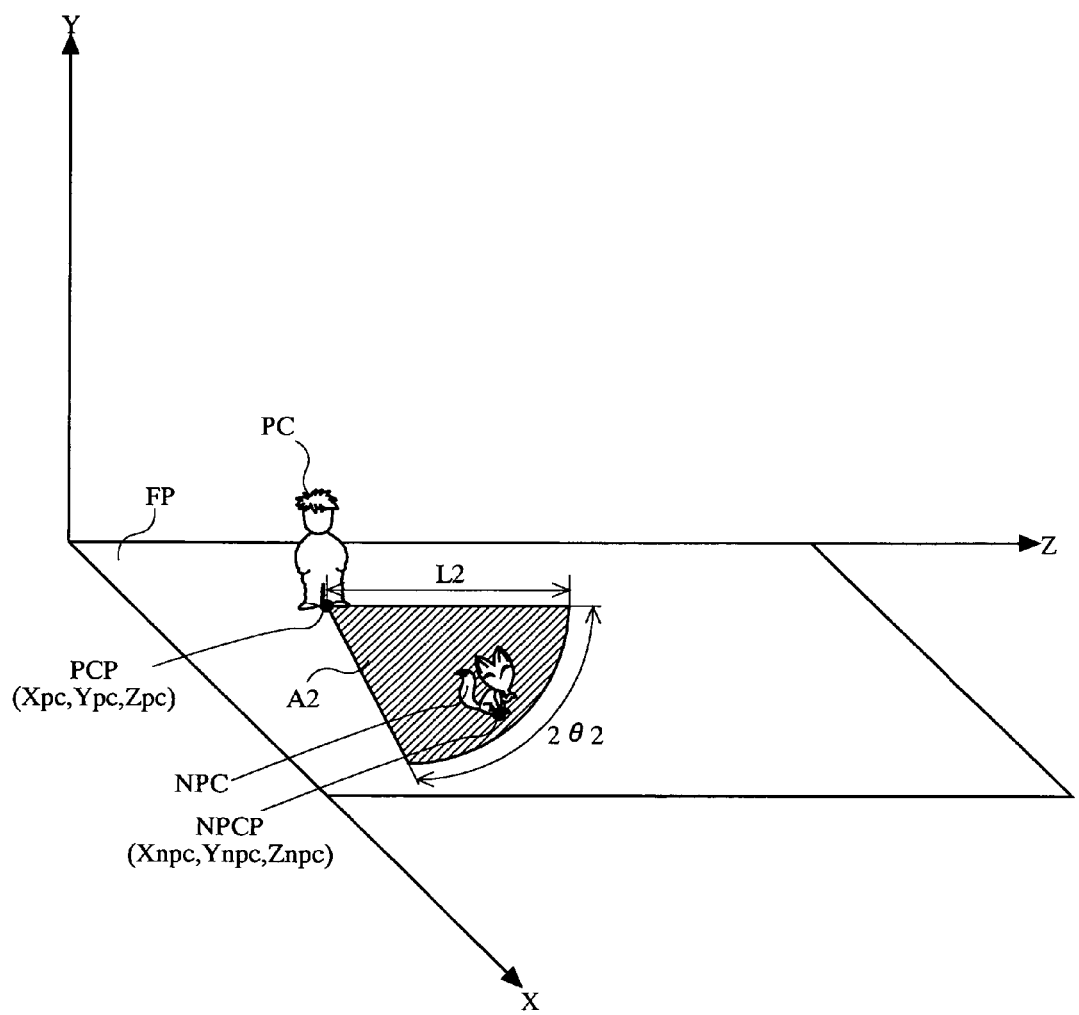
FIG. 8 is a schematic perspective view illustrating a call range A2 set for the player character PC.
Figure 9:
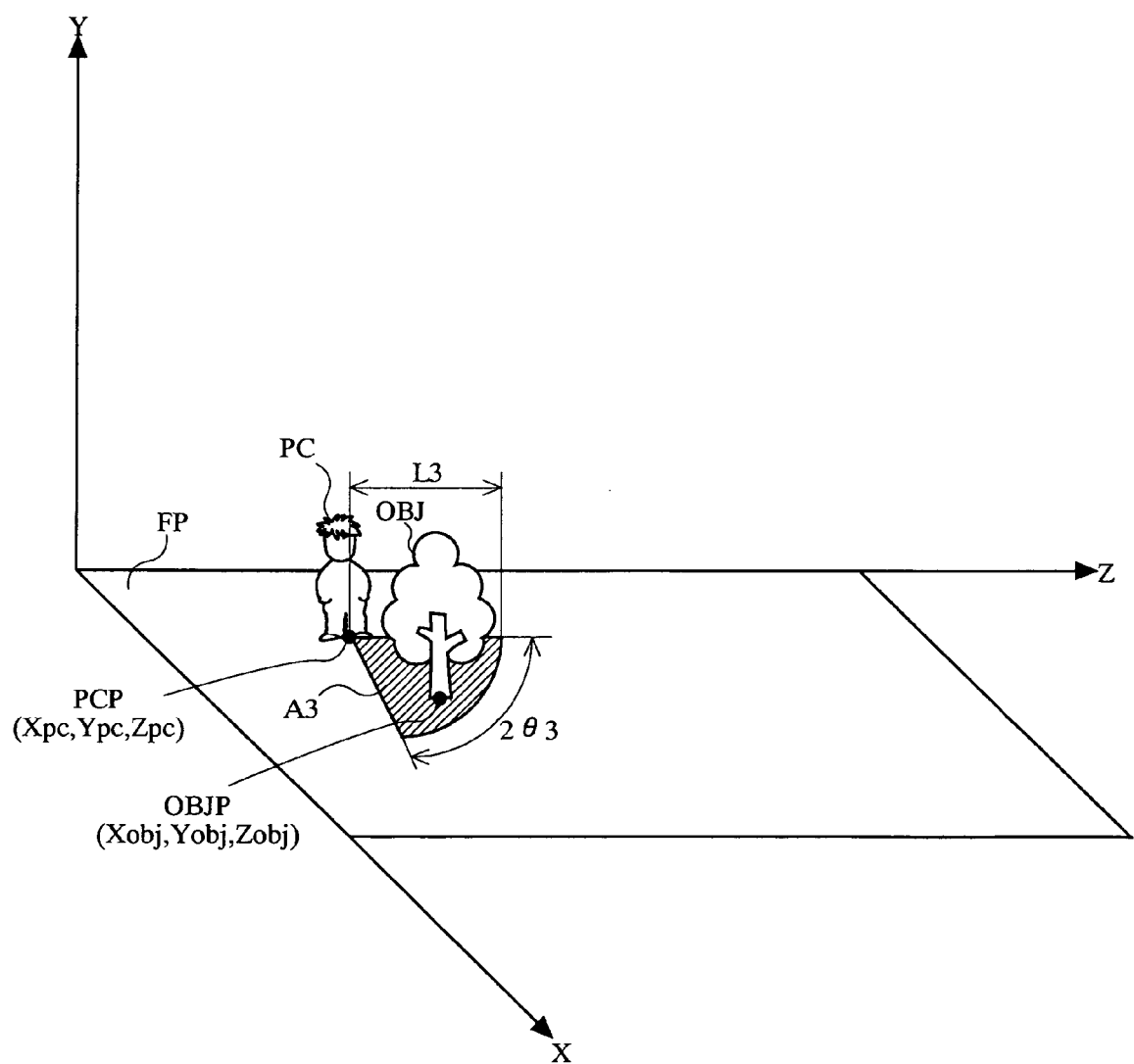
FIG. 9 is a schematic perspective view illustrating an action range A3 set for the player character PC.
Figure 11:
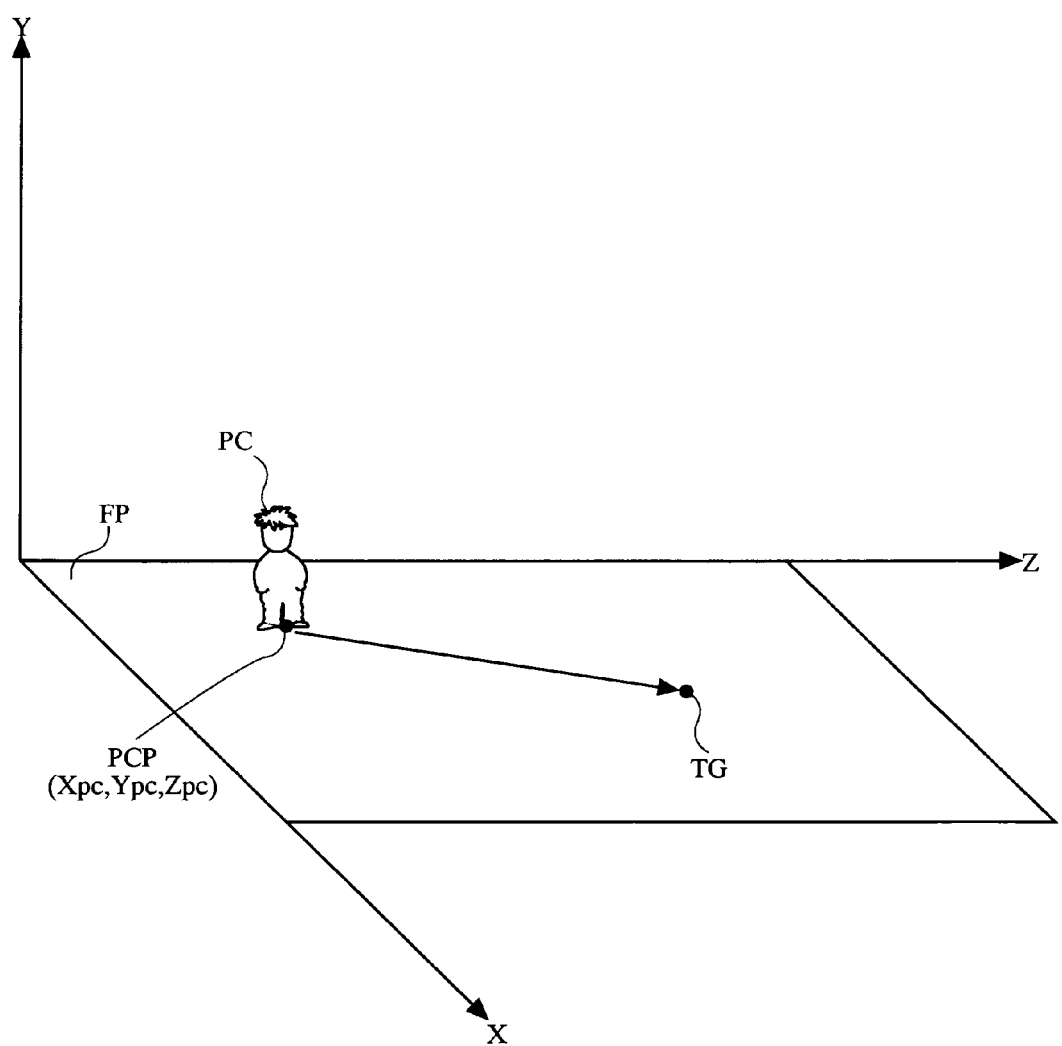
FIG. 11 is a diagram illustrating an action of moving the player character PC.

Next, a specific process operation performed by the game apparatus 1 executing the game program will be described. Firstly, with reference to FIGS. 3 to 11, an example of process, an example of a display method for performing displays on the first LCD 11 and the second LCD 12 through the process operation, and the like will be described. FIG. 3 is a diagram illustrating an example of screen display on the first LCD 11 and the second LCD 12. FIG. 4 is a schematic perspective view illustrating a positional relationship between the touch panel 15 and a drum coordinate system used for obtaining a game image to be displayed on the second LCD 12. FIG. 5 is a side view illustrating a positional relationship between the drum coordinate system and the touch panel 15. FIG. 6 is a schematic perspective view illustrating a plane coordinate system used for a game process. FIG. 7 is a schematic perspective view illustrating a conversation range A1 set for a player character PC. FIG. 8 is a schematic perspective view illustrating a call range A2 set for the player character PC. FIG. 9 is a schematic perspective view illustrating an action range A3 set for the player character PC. FIG. 10 is a diagram illustrating an example of action contents. FIG. 11 is a diagram illustrating an action of moving the player character PC.

In FIG. 3, a game image is displayed on each of the first LCD 11 and the second LCD 12 of the game apparatus 1. The game image is mainly displayed on the second LCD 12. Hereinafter, an image displayed on the second LCD 12 is merely described as a game image.

The player character PC, a non-player character NPC, and objects OBJ are positioned on a drum field FD in a game space and displayed in a game image on the second LCD 12. For example, one player character PC, one non-player character NPC and six objects OBJ1 to OBJ6 are displayed in the game image shown in FIG. 3. The drum field FD is a cylindrical game field in which a portion of the cylindrically curved surface is displayed in the game image and the cylinder axis is horizontally disposed in the game space. The player character PC, the non-player character NPC, and objects OBJ are positioned on the cylindrically curved surface in the drum field FD. For example, the player character PC is a character which can move along the cylindrically curved surface of the drum field FD in the game space. Further, a background BI (for example, the sky) is displayed at the back of the drum field FD. In FIG. 3, for example, the game image is obtained by perspective-projecting the cylindrically curved surface from a virtual camera when the cylindrically curved surface as seen from the side of the drum field FD is set as a sight point and a portion of the cylindrically curved surface is set as a rendered range.

FIG. 4 shows a virtual three-dimensional game space in which the touch panel 15 and a virtual camera C used for obtaining the game image are disposed. In a drum coordinate system, the drum field FD, the background BI, and a virtual wall W are disposed in the game space. The virtual wall W is, for example, a virtual transparent plane set parallel to the cylinder axis of the drum field FD. The virtual camera C is disposed at the side of the cylindrically curved surface of the drum field FD. The game space set in a viewing volume between predetermined clipping planes based on a camera position of the virtual camera C is displayed in the game image on the second LCD 12. In FIG. 4, for example, the game image is composed of an image IM1 and an image IM2. The image IM1 is obtained by perspective-projecting, from the virtual camera C, a portion of the cylindrically curved surface of the drum field FD. The image IM2 is obtained by perspective-projecting, through a portion of the virtual wall W at the back of the drum field FD, the background BI rendered at the back of the virtual wall W. At this time, a rendering model of each of the objects, such as the player character PC and the object OBJ in FIG. 4, is positioned on the drum field FD, based on a position which is obtained by converting position coordinates described below into coordinates in the drum coordinate system. The rendering models in the viewing volume are also displayed on the second LCD 12. The touch panel 15 is represented at the near clipping plane as seen from the virtual camera C (that is, at the side of the virtual camera C), thereby setting a touch panel coordinate system. Input coordinates from the touch panel 15 are perspective-projected along a line of sight direction of the virtual camera C into the game space.

FIG. 5 shows that touch input coordinates obtained when a player touches the touch panel 15 are perspective-projected into the game space. In the present embodiment, a simplified model is used for determining a target object touch-operated by the player. Here, the simplified model is a model obtained by simplifying each rendering model used for obtaining a game image. The simplified model is defined by a type of a standard solid and a size thereof. The simplified model of each object is positioned on the drum field FD based on a position obtained by converting the position coordinates described below into coordinates in the drum coordinate system. In FIG. 5, for example, the player character PC is positioned as the simplified model PCe having a ball on the top of a column at a position on the drum field FD obtained by converting the position coordinates into the coordinates in the drum coordinate system. Further, the object OBJ is positioned as the simplified model OBJe having a triangular pyramid on the top of a column at a position on the drum field FD obtained by converting the position coordinates into the coordinates in the drum coordinate system.

For example, when a player touch-operates the touch panel 15 at a position indicated as a stick 16a, a straight line (marked by dotted lines in FIG. 5) which is obtained by perspective-projecting touch input coordinates obtained by the touch-operation into the game space along the line of sight direction extending radially from the virtual camera C, intersects or contacts the simplified model PCe. At this time, it is determined that the player character PC corresponding to the simplified model PCe is touch-operated by the player. Further, it is determined that an intersection point TPDa at which the straight line intersects the drum field FD through the simplified model PCe is a point on the drum coordinate system field touch-operated by the player.

When the player touch-operates the touch panel 15 at a position indicated as a stick 16b, a straight line which is obtained by perspective-projecting touch input coordinates obtained by the touch-operation into the game space along the line of sight direction extending radially from the virtual camera C, intersects or contacts the simplified model OBJe. At this time, it is determined that the object OBJ corresponding to the simplified model OBJe is touch-operated by the player. Further, it is determined that an intersection point TPDb at which the straight line intersects the drum field FD through the simplified model OBJe is a point on the drum coordinate system field touch-operated by the player.

When the player touch-operates the touch panel 15 at a position indicated as a stick 16c, a straight line which is obtained by perspective-projecting touch input coordinates obtained by the touch-operation into the game space along the line of sight direction extending radially from the virtual camera C directly intersects the drum field FD. At this time, it is determined that an intersection point TPDc at which the straight line intersects the drum field FD is a point on the drum coordinate system field touch-operated by the player. In this case, it is determined that there are no character and object having been touch-operated by the player.

When the player touch-operates the touch panel 15 at a position indicated as a stick 16d (that is, when the player touch-operates the game image displayed as the background), a straight line which is obtained by perspective-projecting touch input coordinates obtained by the touch-operation into the game space along the line of sight direction extending radially from the virtual camera C directly intersects the virtual wall W. At this time, it is determined that an intersection point TPDd at which the straight line intersects the virtual wall W is a point on the drum coordinate system field touch-operated by the player. Also in this case, it is determined that there are no character and object having been touch-operated by the player.

Thus, the simplified model obtained by simplifying a rendering model which is actually rendered is used so as to determine an object touch-operated by a player, thereby reducing processing load for the determination. Further, instead of the whole shape of the rendering model, a portion of the shape to be actually used for the determination may be imitated so as to set the simplified model. For example, for an object representing a house, the rendering model represents the whole house. However, when a process of determining a touch-operated target requires that it is determined whether or not only a door of the house is touch-operated, only the door may be imitated so as to set the simplified model. That is, the shape of the target to be touch-operated can be simplified to set the simplified model, and only an object or a portion of the object required for determining the touch-operated target can be imitated to set the simplified model to be positioned, thereby reducing the number of models to be determined and sizes thereof.

In FIG. 6, the game apparatus 1 converts coordinates in the drum coordinate system into coordinates in the plane coordinate system when performing a process for causing a character to move or perform an action. The aforementioned process is performed in the plane coordinate system and thereafter the position coordinates for each object are converted into coordinates in the drum coordinate system again so as to position rendering models on the drum field FD and generate game images to be displayed on the second LCD 12 as shown in FIG. 4.

For example, a cylinder axis direction of the drum field FD is converted into an X-axis direction of the plane coordinate system. Further, a circumferential direction of the cylindrically curved surface in the drum field FD is converted into a Z-axis direction of the plane coordinate system. Further, a radial direction (direction of gravity) which is perpendicular to the cylinder axis and away from the cylindrically curved surface of the drum field FD is converted into a Y-axis direction of the plane coordinate system. As a result of the conversion, a plane field FP obtained by spreading the cylindrically curved surface of the drum field FD so as to be a plane of Y=0 is set so as to have the plane coordinate system. That is, a coordinate system for a plane game field (plane field FP) is defined so as to correspond to a coordinate system for a game field of a curved surface (drum field FD). In the present embodiment, a coordinate in the cylinder axis direction of the drum field FD is converted as it is into the X-axis coordinate of the plane coordinate system. Further, a coordinate in the circumferential direction of the drum field FD is converted into the Z-axis coordinate of the plane coordinate system such that a length of the entire circumference or a length of a portion of the circumference of the cylindrically curved surface of the drum field FD is set as the length in the Z-axis direction of the plane coordinate system.

The virtual wall W intersects the cylindrically curved surface so as to stand, parallel to the touch panel 15 (clipping plane), on the cylindrically curved surface of the drum field FD as shown in FIG. 5. Accordingly, a plane field Wp corresponding to the virtual wall W is set in the plane coordinate system. A line of intersection of the plane field Wp and the plane field FP is a straight line (Y=0, Z=Zw (a constant value)) in the plane coordinate system into which a line of intersection of the virtual wall W and the cylindrically curved surface is converted according to the aforementioned coordinate conversion. The plane field Wp is a plane having Z=Zw (constant value) and standing on the straight line in the Y-axis direction. Thereby, coordinates on the virtual wall W in the drum coordinate system are converted into coordinates on the plane field Wp. Specifically, a coordinate in the cylinder axis direction along the virtual wall W is converted into the X-axis coordinate in the plane coordinate system. A length from the line of intersection of the drum field FD and the virtual wall W in the direction perpendicular to the cylinder axis along the virtual wall W, is converted into the Y-axis coordinate in the plane coordinate system. Further, a coordinate on the virtual wall W is converted into the Z-axis coordinate Zw in the plane coordinate system.

Here, as shown in FIG. 6, the respective objects are positioned on the plane field FP according to object data (position coordinates) described below. In FIG. 6, for example, the player character PC is positioned at position coordinates PCP (Xpc, Ypc, Zpc) in the plane field FP. The object OBJ is positioned at position coordinates OBJP (Xobj, Yobj, Zobj) in the plane field FP. Further, the aforementioned intersection point TPDa on the drum field FD touch-operated by the player is converted into an intersection point TPPa according to the aforementioned coordinate conversion manner. The aforementioned intersection point TPDb on the drum field FD touch-operated by the player is converted into an intersection point TPPb according to the aforementioned coordinate conversion manner. The aforementioned intersection point TPDc on the drum field FD touch-operated by the player is converted into an intersection point TPPc according to the aforementioned coordinate conversion manner. The aforementioned intersection point TPDd on the virtual wall W touch-operated by the player is converted into an intersection point TPPd on the plane field Wp according to the aforementioned coordinate conversion manner, and thereafter the intersection point TPPd is converted into a target point TG of Y=0, that is, the intersection point TPPd is moved in the negative Y-axis direction along the plane field Wp.

In FIG. 7, a conversion range A1 is set for the player character PC. The conversion range A1 is set on the plane field FP as a sector-shaped range having as a radius a predetermined distance from the front side of the player character PC, a predetermined angle between the facing direction of the player character PC and a direction offset to the right side of the facing direction and the same predetermined angle between the facing direction of the player character PC and a direction offset to the left side of the facing direction. For example, the conversion range A1 is set as a sector-shaped range having as a radius a distance L1 from the front side of the player character PC, an angle θ1 between the facing direction of the player character PC and a direction offset to the right side of the facing direction, and the angle θ1 between the facing direction of the player character PC and a direction offset to the left side of the facing direction. When an action target (non-player character NPC) is in the conversion range A1, the player character PC performs an action (conversation action) for making a conversation with the action target (non-player character NPC).

In FIG. 8, a call range A2 is set for the player character PC. The call range A2 is set on the plane field FP as a sector-shaped range having as a radius a predetermined distance from the front side of the player character PC, a predetermined angle between the facing direction of the player character PC and a direction offset to the right side of the facing direction and the same predetermined angle between the facing direction of the player character PC and a direction offset to the left side of the facing direction. For example, the call range A2 is set as a sector-shaped range having as a radius a distance L2 (L1<L2) from the front side of the player character PC, an angle θ2 (θ1≦θ2) between the facing direction of the player character PC and a direction offset to the right side of the facing direction, and the angle θ2 between the facing direction of the player character PC and a direction offset to the left side of the facing direction. When an action target (non-player character NPC) is in the call range A2, the player character PC performs an action (call action) for calling the action target (non-player character NPC).

In FIG. 9, an action range A3 is set for the player character PC. The action range A3 is set on the plane field FP as a sector-shaped range having as a radius a predetermined distance from the front side of the player character PC, a predetermined angle between the facing direction of the player character PC and a direction offset to the right side of the facing direction, and the same predetermined angle between the facing direction of the player character PC and a direction offset to the left side of the facing direction. For example, the action range A3 is set as a sector-shaped range having as a radius a distance L3 from the front side of the player character PC, an angle θ3 between the facing direction of the player character PC and a direction offset to the right side of the facing direction, and the angle θ3 between the facing direction of the player character PC and a direction offset to the left side of the facing direction. When an action target (the object OBJ, the non-player character NPC, or the plane field FP) is in the action range A3, the player character PC performs an action according to the action target (the object OBJ, the non-player character NPC, or the plane field FP) or an equipment held by the player character PC. While the action range A3 is set as a sector-shaped range in front of the player character PC, the angle θ3 and the distance L3 may be changed depending on a type of the action target and an equipment held by the player character PC.

FIG. 10 shows examples of actions each of which is determined based on a combination of a target touch-operated in the action range A3 and an equipment held by the player character PC. While the action is realized by branching a process flow, the action may be processed with reference to a table containing actions to be performed according to the combinations. For example, when the player character PC has a shovel and the touch-operated target is a ground (plane field FP) in the action range A3, the player character PC digs the ground (plane field FP) with the shovel. When the player character PC has an ax and the touch-operated target is a tree (object OBJ) in the action range A3, the player character PC cuts the tree (object OBJ) with the ax. When the player character PC has a fishing rod and the touch-operated target is a river (plane field FP) in the action range A3, the player character PC does some fishing in the river (plane field FP) with the fishing rod. The aforementioned target on which a specific action is to be performed according to the combination of the equipment (item) of the player character PC and the touch-operated target in the action range A3 is referred to as an action target of the item. Further, regardless of the equipment held by the player character PC, when the touch-operated target is a mailbox (object OBJ) in the action range A3, the player character PC always opens the mailbox (object OBJ). The common action to be performed on the touch-operated target in the action range A3 regardless of the equipment held by the player character PC is referred to as a normal action, and a target on which the normal action is to be performed is referred to as a normal action target. With reference to FIG. 10, a case where the target in the action range A3 is touch-operated is described. However, also when the player character PC is touch-operated in the case of the target being in the action range A3 thereof, the player character PC may perform a similar action according to the combination.

Thus, while an action of the player character PC is determined according to the combination of the target and the equipment, a size of the action range A3 is preferably changed according to the combination. For example, when the player character PC performs an action using the fishing rod, the distance L3 of the action range A3 is preferably set so as to be longer, as compared to a case where the player character PC performs an action using the shovel, thereby providing a natural action. Thus, the action range A3 can have a size varying depending on characteristics of the character and the equipment, a type of the target, and the like.

On the other hand, according to some of the combinations of the equipment of the player character PC and the type of the target in the action range A3, the player character PC may be caused to perform no specific action. For example, when the player character PC has a shovel and the touch-operated target is a tree (object OBJ) in the action range A3, the player character PC is moved. When the player character PC has an ax and the touch-operated target is a ground or a river (plane field FP) in the action range A3, the player character PC is moved. Further, when the player character PC has a fishing rod and the touch-operated target is a ground (plane field FP), a tree(object OBJ), or a rock (object OBJ) in the action range A3, the player character PC is moved.

In FIG. 11, when the touch-operated target does not make such a combination with the equipment held by the player character PC as to cause the aforementioned specific action or normal action to be performed, the player character PC is caused to move, at a predetermined speed, toward a target point TG which is an intersection point TPP (see FIG. 6) on the plane field FP having been touch-operated. Here, when the touch-operated target is the virtual wall W, the touch input coordinates are converted into the target point TG on the plane field FP as described above. Therefore, the player character PC is caused to move toward the target point TG.

Thus, according to the present embodiment, movement of the player character PC, an action between the player character PC and the non-player character NPC or the object OBJ, and the like are processed using the plane field FP. That is, the game apparatus 1 processes the action and the movement of the character using the plane coordinate system. The game apparatus 1 performs the processes in the plane coordinate system and thereafter converts, into coordinates in the drum coordinate system, position coordinates for each character or object in the plane coordinate system again, thereby positioning the rendering models for the respective characters and objects on the drum field FD as shown in FIG. 4. The drum field FD having the rendering models positioned thereon is taken by the virtual camera C and represented in an image, thereby generating a game image.

Figure 12:
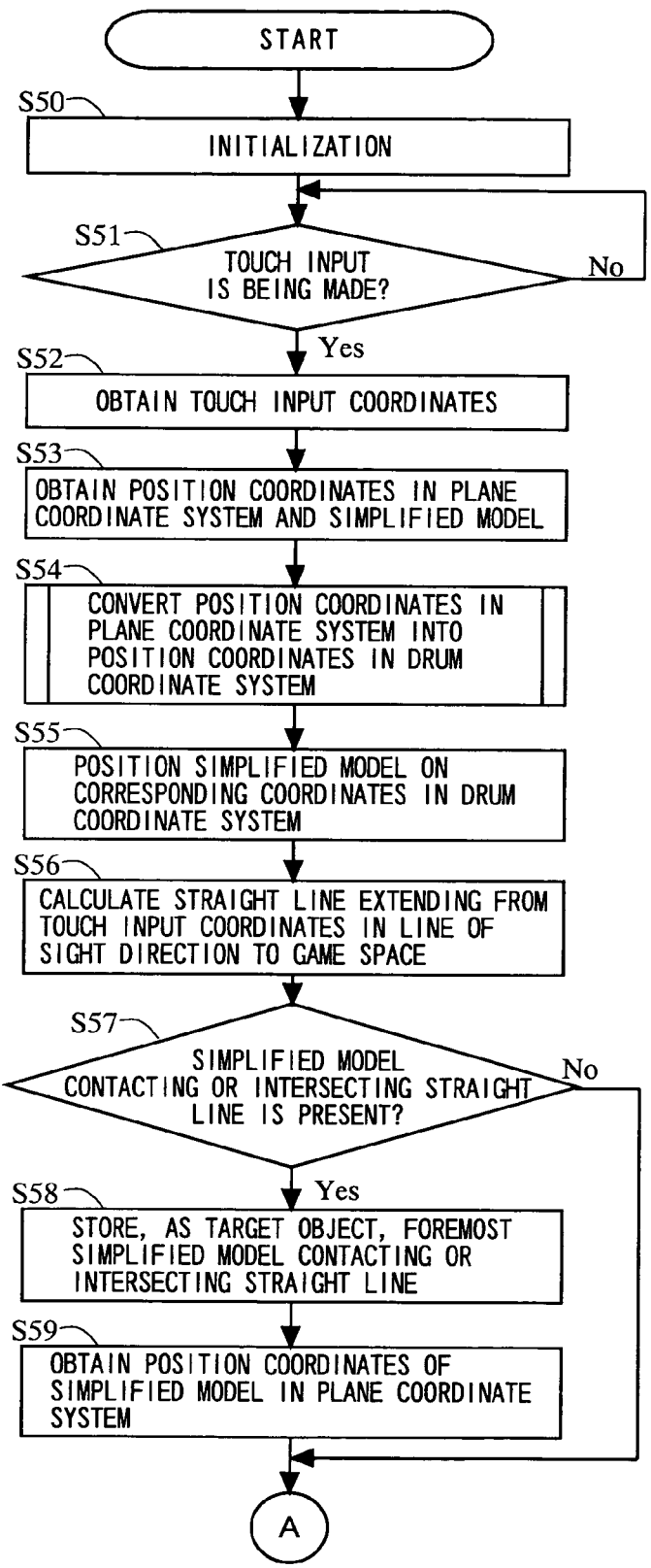
FIG. 12 is a flow chart illustrating a former part of the game process performed by the game apparatus 1 by executing the game program according to the disclosed embodiment(s)
Figure 13:
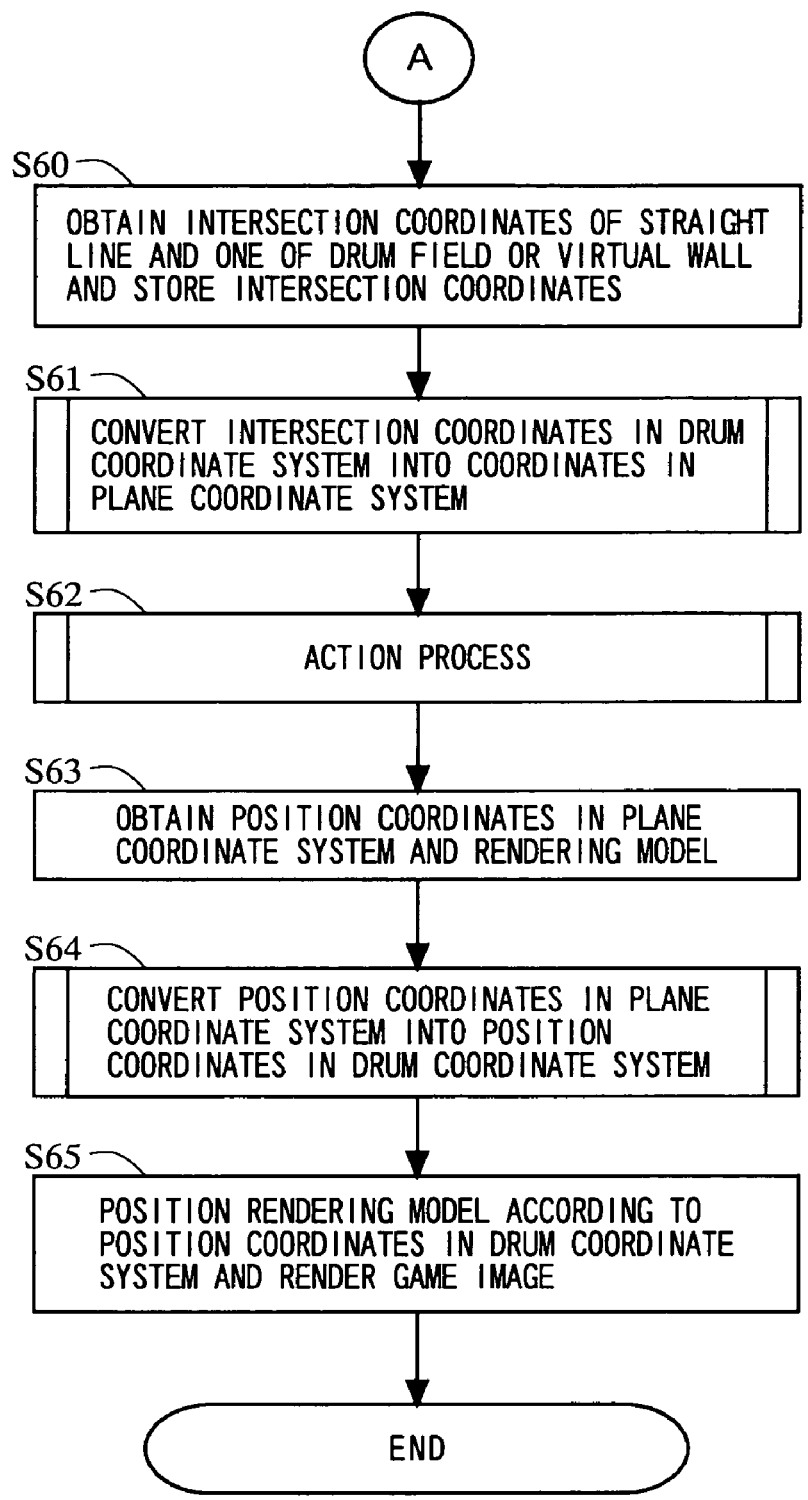
FIG. 13 is a flow chart illustrating a latter part of the game process performed by the game apparatus 1 by executing the game program according to the disclosed embodiment(s)
Figure 14:
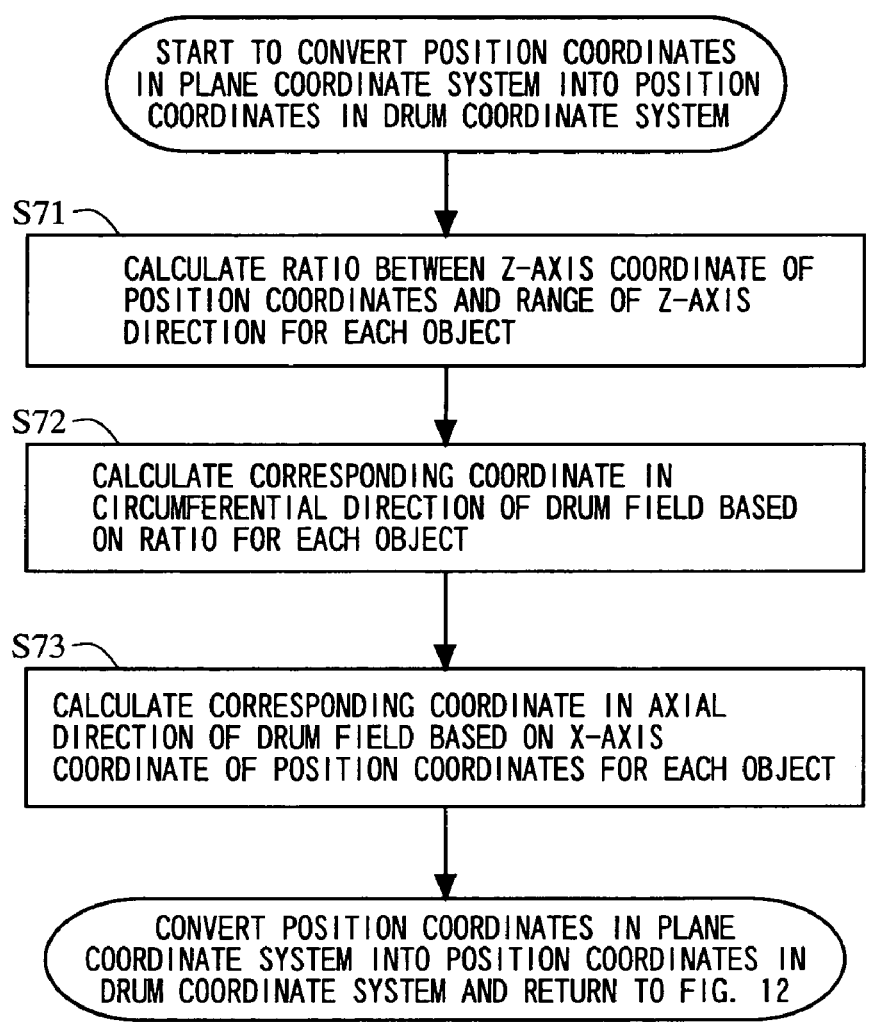
FIG. 14 shows in detail a subroutine of a process for converting position coordinates in the plane coordinate system into position coordinates in the drum coordinate system as shown in step 54 of FIG. 12 and step 64 of FIG. 13.
Figure 15:
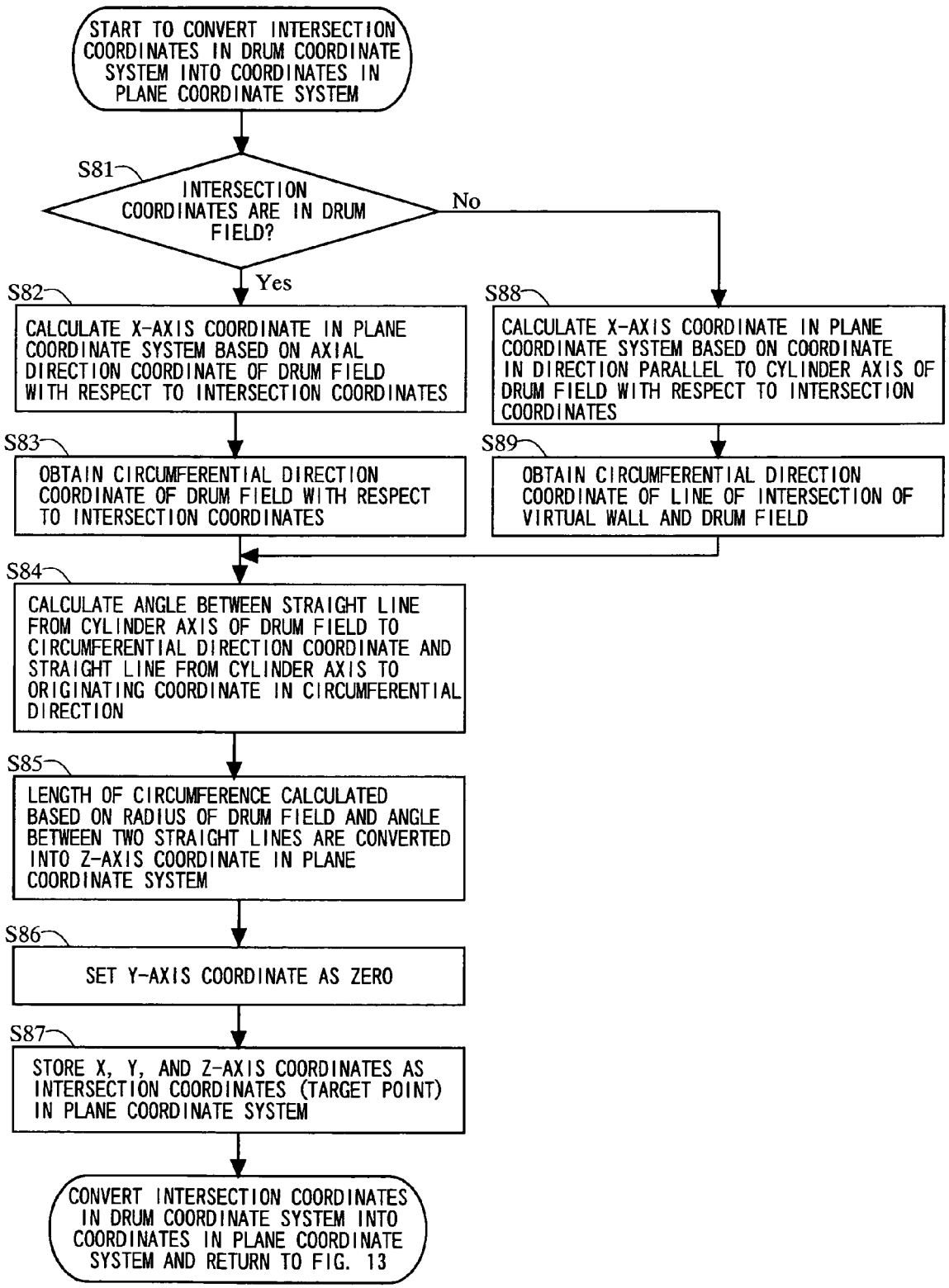
FIG. 15 shows in detail a subroutine of a process for converting intersection coordinates in the drum coordinate system into coordinates in the plane coordinate system as shown in step 61 of FIG. 13.
Figure 16:
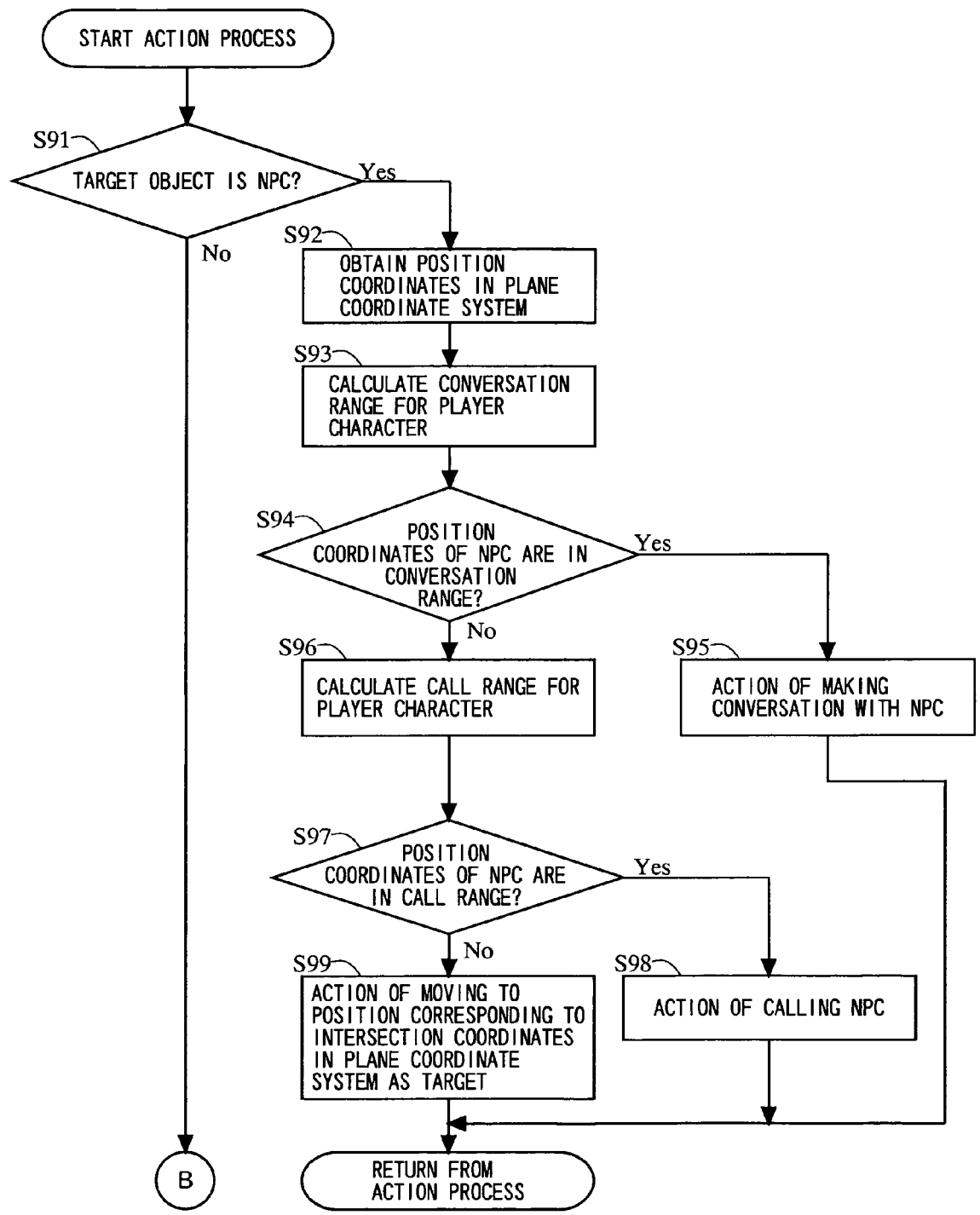
FIG. 16 shows in detail a subroutine of a former part of the action process of step 62 shown in FIG. 13.
Figure 17:
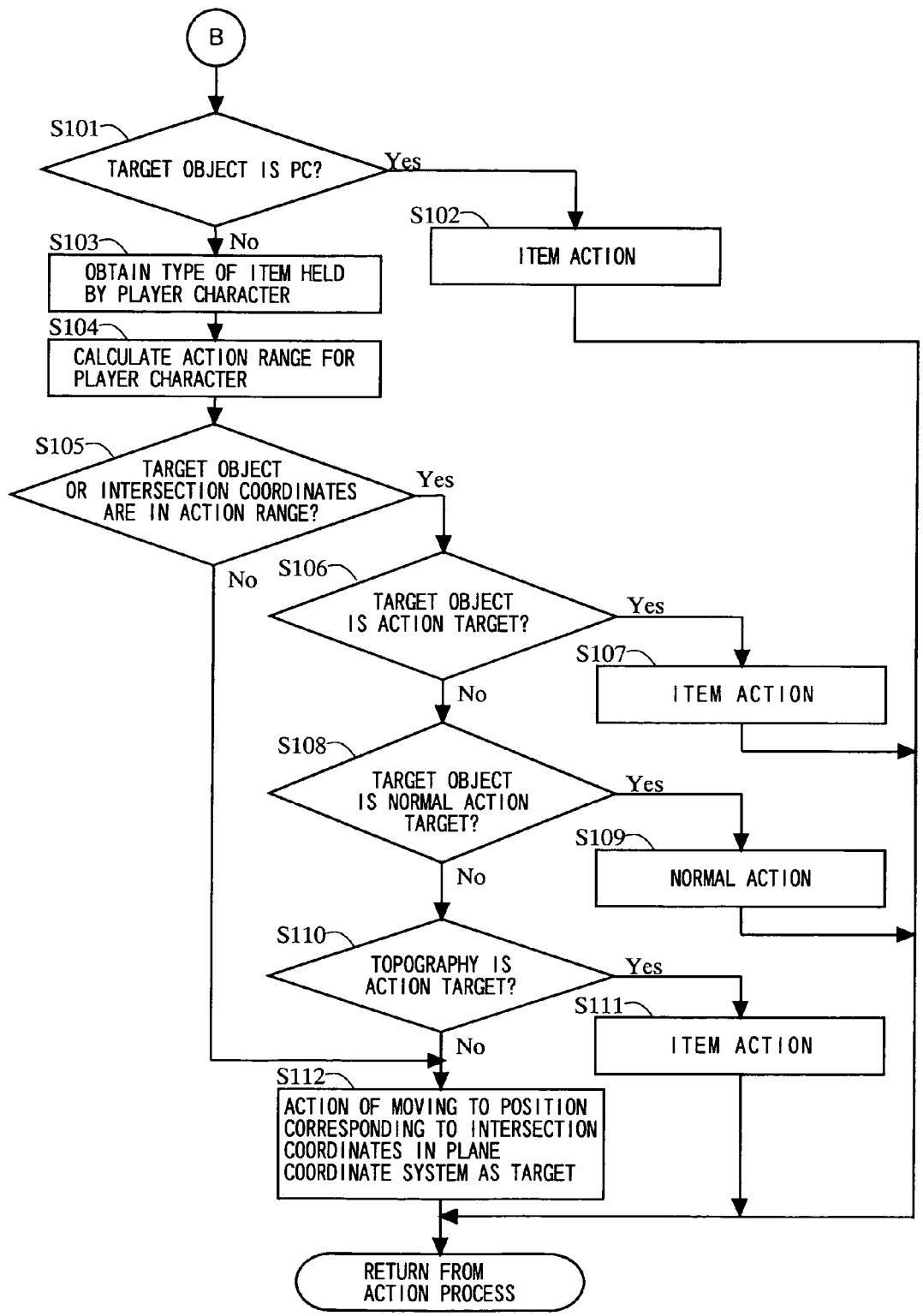
FIG. 17 shows in detail a subroutine of a latter part of the action process of step 62 shown in FIG. 13.
Figure 18:
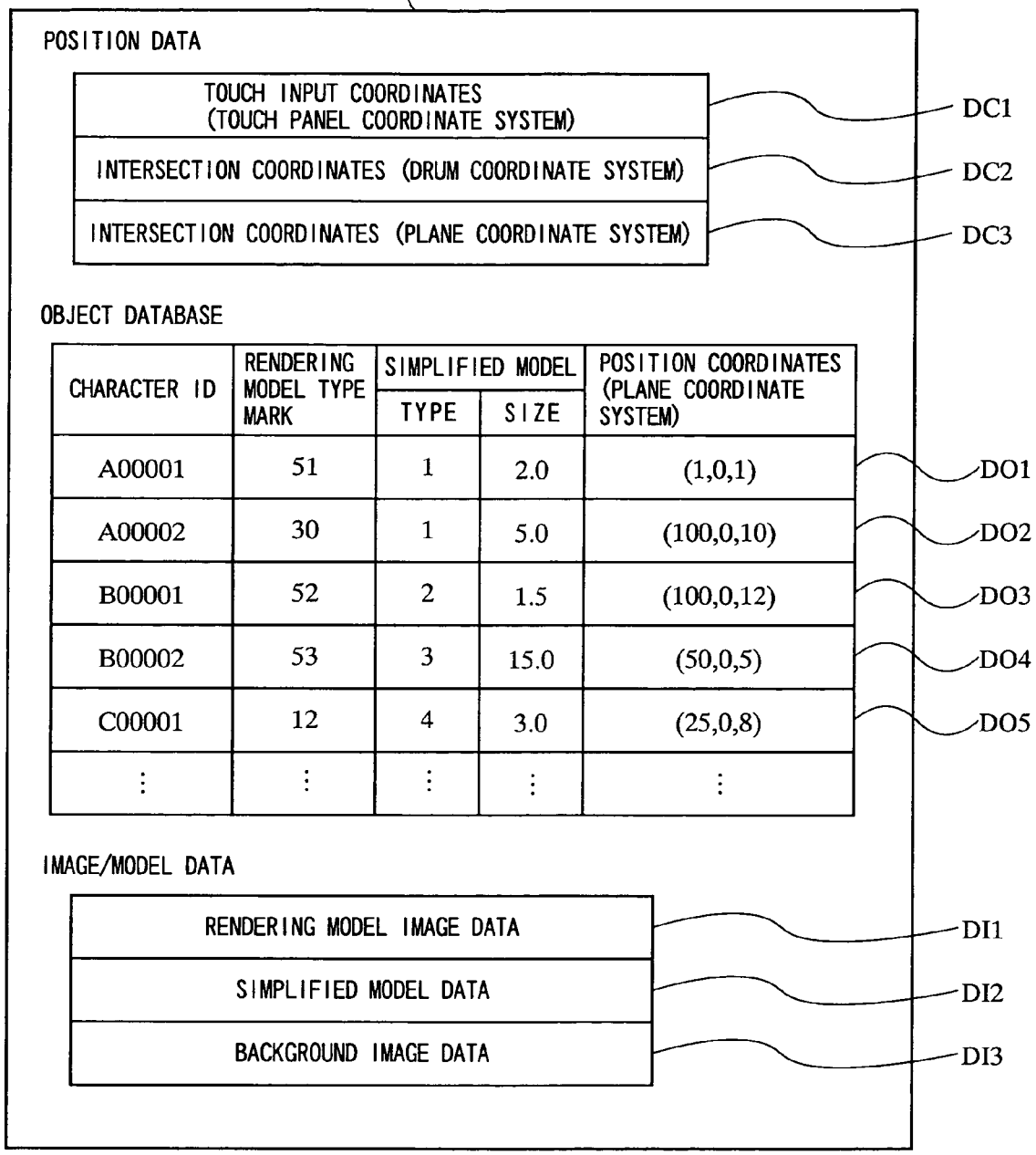
FIG. 18 is a diagram illustrating examples of various data to be stored in a RAM 24 during the processes shown in FIGS. 12 and 13.

Next, with reference to FIGS. 12 to 18, a process performed by the game apparatus 1 executing the game program will be specifically described. FIG. 12 is a flow chart illustrating a former part of the game process performed by the game apparatus 1 by executing the game program. FIG. 13 is a flow chart illustrating a latter part of the game process performed by the game apparatus 1 by executing the game program. FIG. 14 shows in detail a subroutine of a process for converting position coordinates in the plane coordinate system into position coordinates in the drum coordinate system as shown in step 54 of FIG. 12 and step 64 of FIG. 13. FIG. 15 shows in detail a subroutine of a process for converting intersection coordinates in the drum coordinate system into coordinates in the plane coordinate system as shown in step 61 of FIG. 13. FIG. 16 shows in detail a subroutine of a former part of the action process of step 62 shown in FIG. 13. FIG. 17 shows in detail a subroutine of a latter part of the action process of step 62 shown in FIG. 13. FIG. 18 is a diagram illustrating examples of various data to be stored in the RAM 24 during the processes shown in FIGS. 12 and 13. The program for executing the processes are contained in the game program stored in the ROM 17a, and when the game apparatus 1 is turned on, the program is loaded from the ROM 17a to the RAM 24 and executed by the CPU core 21.

Initially, when the power supply (not shown) of the game apparatus 1 is turned on, the CPU core 21 executes a boot program (not shown), whereby the game program stored in the memory card 17 is loaded to the RAM 24. The game program having been loaded is executed by the CPU core 21, whereby the steps (a step is abbreviated as "S" in FIGS. 12 to 17) shown in FIGS. 12 and 13 are executed.

In FIG. 12, the CPU core 21 performs an initialization for the game in step 50, and advances the process to the next step. For example, as the initialization performed in step 50, the CPU core 21 sets up data relating to objects which appear in the game space. As shown in FIG. 18, in the initialization, object data DO1, DO2, . . . , DO5, . . . corresponding to the respective objects, and the like are stored in the RAM 24 as object database used for positioning the respective objects in the game space. Each of the object data DO1, DO2, . . . , DO5, . . . contains a character ID, a rendering model type mark, a type and a size of a simplified model, and data indicating position coordinates. The character ID is a number which is assigned individually to each object and which enables a type of the object to be identified (that is, it indicates whether the object is a player character, a non-player character, another object or the like). The rendering model type mark is a mark for designating rendering model image data DI1 for each object to be positioned in the drum field FD when a game image is generated. The type and the size of the simplified model represent marks for indicating, for each object, the respective type and size of the simplified model data DI2 used for identifying a target object having been touch-operated by the player. The position coordinates represent data indicating a position of each object to be positioned in the plane coordinate system as three-dimensional coordinates (X, Y, Z). Further, as necessary, rendering model image data DI1, simplified model data DI2, background image data DI3, and the like are stored in the RAM 24 as image data used for generating a game image and model data used for detecting the touch-operated target. Here, the simplified model data DI2 represents a solid model having a very simplified shape such as a column, a ball, or a cone, as compared to the rendering model image data DI1. The simplified model data DI2 is determined depending on the type of the simplified model contained in the object data DO. The solid model has a size varying depending on the size of the simplified model contained in the object data DO.

Returning to FIG. 12, in step 51, the CPU core 21 waits for a touch input from the touch panel 15 according to a user's operation. When a touch input is made (Yes in step 51), the CPU core 21 stores as touch input coordinates DC1 in the RAM 24 coordinates which are in the touch panel coordinate system and which indicate touch position at which the touch panel 15 is being currently touched in step 52, and advances the process to the next step.

For example, as shown in FIG. 18, coordinate data of the touch panel coordinate system inputted from the touch panel 15 is stored in the RAM 24 as touch input coordinates DC1 as necessary. Further, as necessary, intersection coordinates DC2 are stored in the RAM 24 as position data of the drum coordinate system corresponding to the touch input coordinates DC1 and the intersection coordinates DC3 are stored in the RAM 24 as position data of the plane coordinate system corresponding to the intersection coordinates DC2, and the like.

Returning to FIG. 12, the CPU core 21 acquires position coordinates in the plane coordinate system and simplified model (type and size) for each object positioned in the game space based on the object data DO in the object database in step 53. The CPU core 21 converts the position coordinates in the plane coordinate system acquired in step 53 into position coordinates in the drum coordinate system for each object in step 54, and advances the process to the next step. Hereinafter, with reference to FIG. 14, a detailed process of step 54 will be described.

In FIG. 14, for each object, the CPU core 21 calculates a ratio of the Z-axis coordinate of the position coordinates to a range of the Z-axis direction having been previously set in the plane coordinate system in step 71, and advances the process to the next step. Here, the range of the Z-axis direction represents a length in the Z-axis direction of the plane field FP (see FIG. 6) obtained by spreading the whole cylindrically curved surface or a portion of the cylindrically curved surface of the drum field FD (see FIG. 5) so as to be a plane. That is, the range of the Z-axis direction represents a length in the plane coordinate system, the length corresponding to a length of the entire circumference or a length of a portion of the circumference of the cylindrically curved surface of the drum field FD.

Next, in step 72, the CPU core 21 calculates the corresponding coordinate in the circumferential direction of the drum field FD based on the ratio calculated in step 71 for each object, and advances the process to the next step. For example, when the range of the Z-axis direction corresponds to the length of the entire circumference of the cylindrically curved surface, the ratio calculated in step 71 is used as a ratio between the length of the entire circumference and the circumferential length of the corresponding coordinates so as to calculate the circumferential length of the corresponding coordinates. A point which is positively offset by the circumferential length from an originating coordinate point in the circumferential direction of the drum field FD is set as the corresponding coordinate in the circumferential direction of the drum field FD. On the other hand, when the range of the Z-axis direction corresponds to a length of a portion of the circumference of the cylindrically curved surface, the ratio calculated in step 71 is used as a ratio between the length of the portion of circumference and the circumferential length of the corresponding coordinates so as to calculate the circumferential length of the corresponding coordinates. A point which is positively offset by the circumferential length from an originating coordinate point in the circumferential direction of the drum field FD is set as the corresponding coordinate in the circumferential direction of the drum field FD.

Next, for each object, the CPU core 21 calculates, based on the X-axis coordinate of the position coordinates, the corresponding coordinate in the axial direction of the drum field FD in step 73, and ends the process according to the subroutine. For example, the X-axis coordinate of the position coordinates for each object is set as it is as the corresponding coordinate in the axial direction of the drum field FD based on the originating coordinate in the axial direction of the drum field FD. Using a predetermined conversion equation, the X-axis coordinate of the position coordinates for each object may be converted into the corresponding coordinate in the axial direction of the drum field FD. In the aforementioned processes of steps 71 to 73, the position coordinates in the plane coordinate system for each object are converted into the coordinates in the drum coordinate system on the cylindrically curved surface of the drum field FD. In the aforementioned processes of steps 71 to 73, a position coordinate (that is, Y=0) on the plane field FP is converted into the corresponding coordinate on the cylindrically curved surface of the drum field FD. However, needless to say, when the position coordinate is away from the plane field FP in the Y-axis direction (that is, Y>0), the Y-axis coordinate is converted as it is into the corresponding coordinate in the radial direction which is perpendicular to the cylinder axis and away from the cylindrically curved surface of the drum field FD, whereby a point which is not on the plane field FP can be similarly converted into the corresponding coordinate in the drum coordinate system.

Returning to FIG. 12, in step 55, the CPU core 21 is operable to position the respective simplified models according to the corresponding coordinates in the drum coordinate system calculated in step 54, and advances the process to the next step. Specifically, the CPU core 21 generates each of the simplified models based on the type and the size of the simplified model contained in the object data DO and positions each of the simplified models at a position of the corresponding coordinates in the game space of the drum coordinate system (see FIG. 5). In step 55, the simplified models corresponding to the player character PC, the non-player character NPC, and the other objects OBJ appearing in the game space are positioned in the game space of the drum coordinate system.

Next, the CPU core 21 calculates a straight line obtained by perspective-projecting the touch input coordinates DC1 into the game space of the drum coordinate system along the line of sight direction radially extending from the virtual camera C in step 56 (marked by dotted line of FIG. 5). In step 57, the CPU core 21 determines whether or not a simplified model contacts or intersects the straight line calculated in step 56. When it is determined that a simplified model contacts or intersects the straight line, the CPU core 21 advances the process to the next step 58. On the other hand, when it is determined that no simplified model contacts or intersects the straight line, the CPU core 21 advances the process to the next step 60 shown in FIG. 13.

In step 58, the CPU core 21 stores in the RAM 24 an object (character ID) corresponding to the foremost (as seen from the virtual camera C) simplified model (that is, the simplified model closest to the virtual camera C) among simplified models which are determined as contacting or intersecting the straight line. The CPU core 21 acquires, from the object database, position coordinates in the plane coordinate system for the object (character ID) corresponding to the foremost simplified model in step 59, and advances the process to the next step 60 shown in FIG. 13. Hereinafter, the object corresponding to the foremost simplified model contacting or intersecting the straight line is referred to as a touch-operated target object. For example, as shown in FIG. 5, when the touch panel 15 is touch-operated at the position indicated as the stick 16b, acquired are the character ID corresponding to the simplified model OBJe intersecting the straight line calculated from the touch input coordinates DC1, and position coordinates thereof in the plane coordinate system, thereby setting the object corresponding to the simplified model OBJe as the touch-operated target object.

In step 60, the CPU core 21 acquires coordinates of intersection of the straight line calculated in step 56 and one of the drum field FD or the virtual wall W, and stores the acquired intersection coordinates as intersection coordinates DC2 in the RAM 24. For example, as shown in FIG. 5, when the touch panel 15 is touch-operated at the positions indicated as the sticks 16a to 16c, intersection coordinates TPDa to TPDc at which the drum field FD intersects the straight line calculated from the touch input coordinates DC1 are obtained, respectively. Further, as shown in FIG. 5, when the touch panel 15 is touch-operated at the position indicated as the stick 16d, the intersection coordinates TPDd at which the virtual wall W intersects the straight line calculated from the touch input coordinates DC1 is obtained. The CPU core 21 converts the intersection coordinates acquired in step 60 into coordinates in the plane coordinate system in step 61, and advances the process to the next step. Hereinafter, with reference to FIG. 15, a detailed process of step 61 will be described.

In FIG. 15, the CPU core 21 determines whether or not the intersection coordinates obtained in step 60 are on the drum field FD in step 81. When it is determined that the intersection coordinates are on the drum field FD, the CPU core 21 advances the process to the next step 82. On the other hand, when it is determined that the intersection coordinates are on the virtual wall W, the CPU core 21 advances the process to the next step 88.

In step 82, the CPU core 21 calculates X-axis coordinate of the plane coordinate system based on the corresponding coordinate in the axial direction of the drum field FD with respect to the intersection coordinates. Next, the CPU core 21 obtains the corresponding coordinate in the circumferential direction of the drum field FD with respect to the intersection coordinates in step 83, and advances the process to the next step 84. The process of step 82 is the inverse of the conversion performed in step 73. Accordingly, for example, the corresponding coordinate in the axial direction of the drum field FD based on the originating coordinate in the axial direction of the drum field FD is set as it is as X-axis coordinate in the plane coordinate system. Further, the corresponding coordinate in the axial direction of the drum field FD may be converted into the X-axis coordinate in the plane coordinate system using a predetermined conversion equation.

On the other hand, in step 88, the CPU core 21 calculates the X-axis coordinate in the plane coordinate system based on the coordinate in the direction parallel to the cylinder axis of the drum field FD with respect to the intersection coordinates. Next, the CPU core 21 obtains the corresponding coordinate in the circumferential direction of the drum field FD with respect to the line of intersection of the virtual wall W and the cylindrically curved surface of the drum field FD in step 89, and advances the process to the next step 84. As described with reference to FIG. 5, the virtual wall W is disposed so as to stand on the cylindrically curved surface of the drum field FD parallel to the touch panel 15 (clipping plane) and intersect the cylindrically curved surface. That is, in step 88, the corresponding coordinate in the same direction as the axial direction of the drum field FD with respect to the virtual wall W is calculated. Further, in step 89, obtained is the corresponding coordinate in the circumferential direction at which the virtual wall W intersects the drum field FD.

In step 84, the CPU core 21 calculates, based on the corresponding coordinate in the circumferential direction of the drum field FD calculated in step 83 or step 89, an angle between a straight line from the cylinder axis to the corresponding coordinate in the circumferential direction and a straight line from the cylinder axis to the originating coordinate in the circumferential direction of the drum field FD. The CPU core 21 calculates, based on the radius of the drum field FD and the angle calculated in step 84, the circumferential length corresponding to the angle. In step 85, the CPU core 21 converts the calculated circumferential length into the Z-axis coordinate based on the range of the Z-axis direction and a ratio between the calculated circumferential length and a length of the entire circumference of the cylindrically curved surface of the drum field FD or a length of a portion of the circumference of the cylindrically curved surface of the drum field FD, the length of the entire circumference or the length of a portion of the circumference corresponding to the range of the Z-axis direction, and advances the process to the next step. Here, the process of step 85 is the inverse of the conversion performed in step 71 and step 72.

Next, the CPU core 21 sets, as zero, Y-axis coordinate in the plane coordinate system with respect to the intersection coordinates in step 86. In step 87, the CPU core 21 stores, as the intersection coordinates DC3 in the plane coordinate system, the X-axis coordinate calculated in step 82 or step 88, the Z-axis coordinate calculated in step 85, and the Y-axis coordinate set in step 86 in the RAM 24, and ends the process of the subroutine. For example, in the processes of steps 81 to 89, the intersection coordinates TPDa to TPDc shown in FIG. 5 are converted into the intersection coordinates (target points) TPPa to TPPc shown in FIG. 6, respectively. Further, in the processes of steps 81 to 89, the intersection coordinates TPDd shown in FIG. 5 are converted into the target point TG shown in FIG. 6.

Returning to FIG. 13, the CPU core 21 performs an action process for the player character PC in the plane coordinate system based on the touch-operated target object and the intersection coordinates DC3 in step 62, and advances the process to the next step. Hereinafter, with reference to FIGS. 16 and 17, the detailed process of step 62 will be described.

In FIG. 16, the CPU core 21 determines whether or not the touch-operated target object is a non-player character NPC in step 91. When it is determined that the target object is a non-player character NPC, the CPU core 21 advances the process to the next step 92. When it is determined that the target object is not a non-player character NPC, the CPU core 21 advances the process to the next step 101 shown in FIG. 17. Here, the CPU core 21 can identify the type of the target object based on the character ID of the target object obtained in step 58.

In step 92, the CPU core 21 obtains position coordinates in the plane coordinate system for the non-player character NPC which is the touch-operated target object. The position coordinates are the same as the position coordinates obtained in step 59. The CPU core 21 obtains the position coordinates and the direction of the player character PC in the plane coordinate system with reference to the object database, and calculates the conversation range A1 for the player character PC based on the plane field FP in step 93 (see FIG. 7), and advances the process to the next step.

Next, the CPU core 21 determines whether or not the position coordinates of the non-player character NPC obtained in step 92 are in the conversation range A1 in step 94. When it is determined that the position coordinates of the non-player character NPC are outside the conversion range A1, the CPU core 21 advances the process to the next step 96. On the other hand, when it is determined that the position coordinates of the non-player character NPC are in the conversation range A1, the CPU core 21 performs an action process for representing an action of the player character PC having a conversation with the non-player character NPC which is the touch-operated target in step 95, and ends the process according to the subroutine. Here, the action of the player character PC having a conversation with the non-player character NPC is an action process for representing in a game image an action of the player character PC and the non-player character NPC exchanging some words therebetween.

In step 96, the CPU core 21 calculates the call range A2 for the player character PC using the plane field FP based on the position coordinates and the direction of the player character PC (see FIG. 8). Next, the CPU core 21 determines whether or not the position coordinates of the non-player character NPC obtained in step 92 are in the call range A2 in step 97. When it is determined that the position coordinates of the non-player character NPC are in the call range A2, the CPU core 21 performs an action process for representing an action of the player character PC calling the non-player character NPC which is the touch-operated target in step 98, and ends the process according to the subroutine. Here, the action of the player character PC calling the non-player character NPC is an action process for representing in a game image an action of only the player character PC speaking to the non-player character NPC which is further away from the player character PC as compared to a distance which is appropriate for making a conversation between the player character PC and the non-placer character NPC.

On the other hand, when it is determined that the position coordinates of the non-player character NPC are outside the call range A2, the CPU core 21 performs an action process for moving the player character PC to the target point TG of the intersection coordinates DC3 on the plane field FP at a predetermined speed in step 99 (see FIG. 11), and ends the process according to the subroutine. Specifically, in the movement action of step 99, the CPU core 21 performs an action for moving the player character PC to the intersection coordinates DC3 at the predetermined speed so as to update the position coordinates of the player character PC in the object database.

In FIG. 17, when it is determined that the target object is not a non-player character NPC, the CPU core 21 determines whether or not the touch-operated target object is the player character PC in step 101. When it is determined that the target object is not a player character PC, the CPU core 21 advances the process to the next step 103. On the other hand, when it is determined that the target object is the player character PC, the CPU core 21 performs an action process for causing the player character PC to perform an action using the equipment thereof, and the like in step 102, and ends the process according to the subroutine. Specifically, when the player touch-operates the player character PC, the player character PC is caused to perform an action using an item held by the player character PC and the like toward the direction in which the player character PC is currently facing, regardless of whether or not an action target is in the direction in which the player character PC is facing. For example, when the player character PC having an ax as the item is touch-operated, the player character PC performs an action of swinging the ax toward the direction in which the player character PC is currently facing. Further, when the player character PC having no item is touch-operated and there is a tree (object OBJ) near the front thereof, the player character PC performs such an action as to shake the tree.

In step 103, the CPU core 21 obtains a type of an item currently held by the player character PC. The CPU core 21 obtains the position coordinates and the direction of the player character PC with reference to the object database, and calculates the action range A3 for the player character PC based on the plane field FP according to the combination of the type of the item and one of the touch-operated target object or a plane field FP type indicated by the intersection coordinates DC3 in step 104 (see FIG. 9), and advances the process to the next step. Here, the CPU core 21 calculates a standard action range A3 based on the position coordinates and the direction of the player character PC, and changes the size of the action range A3 in the plane field FP depending on the combination of the type of the item and one of the touch-operated target object or the plane field FP type indicated by the intersection coordinates DC3. For example, when the player character PC has a fishing rod and the type of the plane field FP having been touch-operated represents a river, the CPU core 21 changes the action range A3 so as to be wider as compared to a case where the player character PC has a fishing rod and a mailbox is the touch-operated target object.

Next, in step 105, the CPU core 21 determines whether or not one of the position coordinates of the touch-operated target object obtained in step 59 or the intersection coordinates DC3 are in the action range A3. When it is determined that one of the position coordinates of the target object or the intersection coordinates DC3 are in the action range A3, the CPU core 21 advances the process to the next step 106. When it is determined that neither the position coordinates of the target object nor the intersection coordinates DC3 are in the action range A3, the CPU core 21 advances the process to the next step 112.

In step 106, the CPU core 21 determines whether or not the target object in the action range A3 is an action target of the item held by the player character PC (see FIG. 10). When it is determined that the target object is not the action target of the item held by the player character PC, the CPU core 21 advances the process to the next step 108. On the other hand, when it is determined that the target object is the action target of the item held by the player character PC, the CPU core 21 performs an action process for causing the player character PC to perform an action specific to the touch-operated target object in step 107, and ends the process according to the subroutine.

The action target of the item determined as the target object in step 106 is an object on which the player character PC performs a specific action using the item. In FIG. 10, for example, when the player character PC has a "shovel", a "rock" which "repels" the shovel, or the like, is an action target for the "shovel" (item). Further, when the player character PC has an "ax", a "tree" which is "cut" by the ax, a "rock" which "repels" the ax, or the like, is an action target for the "ax" (item). Moreover, when the player character PC has a "fishing rod", no object is determined as the action target. Thus, based on the combination of the item and the target object in the action range A3, it is determined whether or not the target object in the action range A3 is an action target in step 106. On the other hand, when a target object which does not make a combination with the item with which the player character PC performs a specific action thereon (for example, "shovel" against "tree") is in the action range A3, the target object is determined as being not the action target in step 106. In step 107, performed is the action process for representing in a game image a specific action according to the combination of the item and the target object in the action range A3.

In step 108, the CPU core 21 determines whether or not the target object in the action range A3 is a normal action target (see FIG. 10) on which a same action is performed regardless of whether or not the player character PC has an item and what the type of the item is. When it is determined that the target object is not the normal action target, the CPU core 21 advances the process to the next step 110. On the other hand, when it is determined that the target object is the normal action target (for example, a "mailbox" in FIG. 10), the CPU core 21 performs an action process for causing the player character PC to perform a common action on the touch-operated target object (normal action; for example, "open the mailbox") in step 109, and ends the process according to the subroutine.

In step 110, the CPU core 21 determines whether or not the type (hereinafter, referred to as a topography) of the plane field FP indicated by the intersection coordinates DC3 in the action range A3 represents an action target of the item held by the player character PC. When the topography is not the action target of the item held by the player character PC, the CPU core 21 advances the process to the next step 112. On the other hand, when the topography is the action target of the item held by the player character PC, the CPU core 21 performs an action process for causing the player character PC to perform a specific action on the plane field FP indicated by the intersection coordinates DC3 in step 111, and ends the process according to the subroutine.

When the action target of the item is determined in step 110, it is determined what type the plane field FP on which the player character PC performs a specific action using the item has. In FIG. 10, for example, when the player character PC has a "shovel", the "ground" in which the player character PC "digs a hole" with the "shovel", a "river" in which the player character PC "swings" the "shovel", or the like is an action target for the "shovel" (item). Further, when the player character PC has a "fishing rod", a "river" in which the player character PC "does some fishing" with the "fishing rod" or the like is an action target for the "fishing rod" (item). Thus, based on the combination of the item and the type of the plane field FP indicated by the intersection coordinates DC3 in the action range A3, it is determined whether or not the type of the plane field FP is the action target in step 110. On the other hand, a topography which does not make a combination with the item with which the player character PC performs a specific action thereon (for example, "ax" against "ground") is determined as being not the action target in step 110. In step 111, the action process is performed for representing in a game image a specific action performed according to the combination of the item and the topography represented by the intersection coordinates DC3 in the action range A3.

In step 112, the CPU core 21 performs an action process for moving the player character PC on the plane field FP to the target point TG of the intersection coordinates DC3 at a predetermined speed (see FIG. 11), and ends the process according to the subroutine. The process is the same as step 99, and a detailed description is not given.

Returning to FIG. 13, the CPU core 21 performs the action process using the plane coordinate system and thereafter obtains position coordinates in the plane coordinate system and rendering model type mark for each object positioned in the game space based on the object data DO contained in the object database in step 63. In step 64, the CPU core 21 converts position coordinates in the plane coordinate system obtained in step 63 into coordinates in the drum coordinate system for each object, and advances the process to the next step. The process of step 64 for converting position coordinates in the plane coordinate system into coordinates in the drum coordinate system for each object is the same as step 54 shown in FIG. 12. Therefore, a detailed description is not given.

Next, in step 65, the CPU core 21 disposes the respective rendering models and renders a game image using the virtual camera C as a point of view according to the corresponding coordinates in the drum coordinate system calculated in step 64, and ends the process according to the flow chart. Specifically, the CPU core 21 refers to the rendering model image data DI1 based on the rendering model type mark contained in each object data DO, and disposes the rendering model image at a position of the corresponding coordinates in the game space of the drum coordinate system for each object (see FIG. 4). In step 65, the rendering models corresponding to the player character PC, the non-player character NPC, and other objects OBJ, which appear in the game space, are disposed in the game space of the drum coordinate system and are rendered in a game image using the virtual camera C as a point of view.

Thus, in the game process executed by the game apparatus 1, the plane field FP is used when performed are the process of moving the player character PC, the process of setting a plurality of determination ranges, the action process and the like. Thereafter, the game apparatus 1 converts position coordinates based on the plane field FP for each object into coordinates in the drum coordinate system, and positions, in the drum field FD, rendering models corresponding to the position coordinates for each object as shown in FIG. 4. The drum field FD having the rendering models positioned thereon is taken by the virtual camera C and represented into an image, thereby generating a game image. Accordingly, the game apparatus 1 performs calculations for moving the objects, determining positions thereof, and the like using the plane field FP, thereby reducing processing load. Further, position coordinates based on a result of the processes are converted into coordinates on the drum field FD and the rendering models positioned in the drum field FD are used to generate a game image, thereby representing in the game image a virtual space with increased stereoscopic effect.

The aforementioned effect can also be obtained by a game apparatus in which the pointing device such as the touch panel 15 for designating an input position or coordinates on a screen is not used as an input device (for example, a typical game apparatus operated by using a cross key or a joystick, pressing a button, or the like). However, when the pointing device such as the touch panel 15 is used as the input device as in the game apparatus 1 according to the aforementioned embodiment, the effect can be enhanced. In the game apparatus 1, when an object in the virtual space represented on the second LCD 12 is designated by controlling the touch panel 15, the simplified models positioned on the drum field FD are used to determine an object designated by a player. Accordingly, the processing load can be reduced in the determination process, thereby enhancing accuracy in determination.

While in the above description the virtual wall W is set so as to be parallel to the near clipping plane (touch panel 15) having the touch panel coordinate system set as shown in FIG. 5, it should be understood that even if the virtual wall W is not parallel to the near clipping plane the touch input operation can be similarly perspective-projected. Further, a case where a game image is obtained by perspective-projection from the virtual camera C as shown in FIG. 5 is described in the embodiment. However, the game image may be generated using parallel projection. Further, the game field set in the drum coordinate system is described as a cylindrical drum field FD. However, any game field of a curved surface, such as a spherical game field, which achieves stereoscopic effect, can be used. The aforementioned coordinate conversion in the X-axis direction and Z-axis direction may be performed in accordance with a curved surface, such as a spherical surface.

Moreover, in the above description, for making the description more specific, a specific coordinate axis is set for describing a coordinate conversion method and specific shapes of the game field and the like are indicated for describing the game process. However, it should be understood that these are merely examples, and the method disclosed herein and the shapes used for the disclosed method are not restricted thereto.

Further, in the aforementioned embodiment, as an example of the liquid crystal display device having two screens, described is a case where the first LCD 11 and the second LCD 12, which are physically separated from each other, are disposed one on top of the other, that is, the liquid crystal display device has the upper screen and the lower screen. However, the display screen may have another structure if the display screen is composed of two screens. For example, the first LCD 11 and the second LCD 12 may be aligned side-by-side on one principal surface of the lower housing 13*b*. Further, a vertically longer LCD, which has the same width as the second LCD 12 and twice the length of the second LCD 12 (that is, the LCD is a physically single LCD but has a size of two display screens), may be disposed on one principal surface of the lower housing 13*b* so as to display the first and the second game images one on top of the other (that is, the first and the second game images are displayed one on top of the other with no boundary portion being provided). Moreover, a horizontally longer LCD, which has the same length as the second LCD 12 and twice the width of the second LCD 12, may be disposed on one principal surface of the lower housing 13*b* so as to display the first and the second game images side-by-side (that is, the first and the second game images may be side-by-side displayed adjacent to each other with no boundary portion being provided). That is, a physically single screen may be divided in two screens so as to display the first and the second game images, respectively. In any of the aforementioned methods for displaying the game images, the touch panel 15 is disposed on the screen on which the second game image is displayed. Furthermore, in a case where the physically single screen is divided into two screens so as to display the first and the second game images, respectively, the touch panel 15 may be disposed all over the whole screen (so as to cover two screens).

In addition, in the aforementioned embodiment, the touch panel 15 is integrated into the game apparatus 1. Needless to say, however, the game apparatus and the touch panel may be separately provided. Further, the touch panel 15 may be provided on the upper principal surface of the first LCD 11. Furthermore, although in the aforementioned embodiment two display screens (that is, the first LCD 11 and the second LCD 12) are provided, the number of display screens provided can be one. That is, in the aforementioned embodiment, it is also possible to provide only the second LCD 12 as a display screen and the touch panel 15 thereon without the first LCD 11 being provided. In addition, in the aforementioned embodiment, the second LCD 12 is not provided and the touch panel 15 may be provided on the upper principal surface of the first LCD 11.

Although in the aforementioned embodiment a touch panel is used as an input device for the game apparatus 1, another pointing device may be used. Here, the pointing device is an input device for designating an input position or coordinates on a screen. For example, a mouse, a track pad, a track ball or the like is used as an input means, and information which relates to the drum coordinate system and is calculated based on the output value outputted from the input means is used. Further, when the aforementioned effect obtained from the determination process according to the player's designation is not anticipated, a game apparatus controlled by an input device other than the pointing device may be used.

Moreover, the game apparatus 1 which is described as a portable game apparatus, is also applicable for an information processing apparatus (game apparatus) such as a typical personal computer.

The storage medium having stored thereon the game program and the game apparatus can represent on a game screen objects positioned on a game field of a curved surface such as a cylindrical game field or a spherical game field using simplified calculations with reduced processing load, and can be used as an information processing apparatus such as the game apparatus representing a game image and the like using the game field of the curved surface, a game program executed by the information processing apparatus, a storage medium having the game program stored thereon, and the like.

While the invention has been described in detail, the foregoing description is in all aspects illustrative and not restrictive. It is understood that numerous other modifications and variations can be devised without departing from the scope of the invention.

What is claimed is:

1. A storage medium having stored thereon a game program to be executed by a computer of a game apparatus which is operated according to an input signal from an input device based on an operation of a player and which displays on a display screen a game image representing at least a portion of a virtual space including a game field of a curved surface in which at least a player object exists and moves about the game field, wherein the game program causes the computer to execute:

a plane position coordinate storage step of storing, in a memory, plane position coordinates indicating a position of the player object in a coordinate system of a plane game field;

a coordinate update step of updating the plane position coordinates in the plane game field stored in the memory, based on an action which is performed by the player object on the plane game field and is determined according to the input signal, wherein the updated plane position coordinates indicate a position of the player object in the coordinate system of the plane game field;

a first coordinate conversion step of performing a coordinate conversion for converting the updated plane position coordinates in the coordinate system based on the plane game field into curved surface position coordinates of the position of the player object in a coordinate system based on the game field of the curved surface; and a display control step of positioning the player object on the game field of the curved surface, based on the curved surface position coordinates, and displaying the player object on the display screen.

2. The storage medium having the game program stored thereon according to claim 1, wherein the game field of the curved surface is cylindrical and at least a portion of a cylindrical periphery is used as a game field, and the first coordinate conversion step includes a step of performing the coordinate conversion so that the plane game field is converted into the cylindrical game field.

3. The storage medium having the game program stored thereon according to claim 2, wherein in the coordinate conversion performed by the first coordinate conversion step, a coordinate of the player object in a first axial direction along the plane game field is converted into a coordinate of the player object in a cylinder axis direction in the cylindrical game field, a coordinate of the player object which is in a second axial direction along the plane game field and is perpendicular to the first axial direction is converted into a coordinate of the player object in a circumferential direction of the cylindrical game field, and a coordinate of the player object which is in a third axial direction and is perpendicular to the plane game field is converted into a coordinate of the player object in a radial direction of the cylindrical game field.

4. The storage medium having the game program stored thereon according to claim 1, wherein the input device is a pointing device for outputting, as the input signal, input coordinates based on a coordinate system of the display screen in accordance with the operation of the player, the game program causes the computer to further execute a curved surface input coordinate calculation step of calculating curved surface input coordinates which overlap with the input coordinates on the display screen and which are set on the game field of the curved surface in the virtual space, and a second coordinate conversion step of performing a coordinate conversion for converting the curved surface input coordinates in the coordinate system based on the game field of the curved surface into plane input coordinates in the coordinate system based on the plane game field, and the coordinate update step includes a step of moving the player object with respect to the plane game field based on the plane input coordinates and updating the plane position coordinates of the player object.

5. The storage medium having the game program stored thereon according to claim 1, wherein:

the input device is a pointing device for outputting, as the input signal, input coordinates based on a coordinate system of the display screen in accordance with the operation of the player;

the plane position coordinate storage step includes a step of further storing, in the memory, plane position coordinates indicating respective positions of other objects in the coordinate system of the plane game field;

the first coordinate conversion step includes a step of performing a coordinate conversion for converting, into the curved surface position coordinates, the plane position coordinates of the respective positions of the other objects; and the game program causes the computer to further execute:

a simplified model storage step of storing, in a memory, simplified models representing a shape of the player object and shapes of the other objects, each of the simplified models obtained by combining standard solids;

a simplified model positioning step of positioning the simplified model of the player object and the respective simplified models of the other objects in the virtual space including the game field of the curved surface, based on the curved surface position coordinates obtained by the coordinate conversion performed by the first coordinate conversion step;

a designated object detection step of detecting, as a designated object having been designated by the player, the simplified model which overlaps with the input coordinates on the display screen and which is positioned in the virtual space; and an action process step of causing the player object to perform, in the plane game field, an action on the designated object detected in the designated object detection step; and the display control step includes a step of positioning, in the virtual space including the game field of the curved surface, the player object which is caused to perform the action by the action process step, and displaying the player object on the display screen.

6. A game apparatus which is operated according to an input signal from an input device based on an operation of a player and which displays on a display screen a game image representing at least a portion of a virtual space including a game field of a curved surface on which at least a player object exists and moves with respect to the curved surface, the game apparatus comprising:

an electronic storage device;

an electronic processor accessing the storage device, the processor executing a plane position coordinate storage control program for storing, in the storage device, plane position coordinates indicating a position of the player object in a coordinate system of a plane game field;

the processor further executing a coordinate update program for updating the plane position coordinates for the player object in the plane game field stored in the storage device, based on an action which is performed by the player object in the plane game field and is determined according to the input signal;

the processor further executing a first coordinate conversion for performing a coordinate conversion for converting the updated plane position coordinates for the player object in a coordinate system based on the plane game field into curved surface position coordinates for the player object in a coordinate system based on the game field of the curved surface; and the processor further executing a display control program for moving the position of the player object on the game field of the curved surface, based on the curved surface position coordinates, and displaying the player object on the display screen.

* * * * *